(12) United States Patent
Brooker et al.

(10) Patent No.: US 10,715,460 B2
(45) Date of Patent: Jul. 14, 2020

(54) OPPORTUNISTIC RESOURCE MIGRATION TO OPTIMIZE RESOURCE PLACEMENT

(71) Applicant: Amazon Technologies, Inc., Seattle, WA (US)

(72) Inventors: Marc John Brooker, Seattle, WA (US); Christopher Magee Greenwood, Seattle, WA (US); Surya Prakash Dhoolam, Seattle, WA (US); James Michael Thompson, Seattle, WA (US); Marc Stephen Olson, Bellevue, WA (US); Mitchell Gannon Flaherty, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/642,445

(22) Filed: Mar. 9, 2015

(65) Prior Publication Data

US 2016/0269313 A1    Sep. 15, 2016

(51) Int. Cl.
| | | |
|---|---|---|
| *H04L 12/911* | (2013.01) | |
| *G06F 9/50* | (2006.01) | |
| *G06F 9/455* | (2018.01) | |

(52) U.S. Cl.
CPC ........ *H04L 47/783* (2013.01); *G06F 9/45533* (2013.01); *G06F 9/5072* (2013.01); *G06F 9/5083* (2013.01)

(58) Field of Classification Search
CPC . H04L 47/783; G06F 9/45533; G06F 9/5072; G06F 9/5083

(Continued)

(56) References Cited

U.S. PATENT DOCUMENTS

| | | |
|---|---|---|
| 5,574,878 A | 11/1996 | Onodera et al. |
| 6,463,509 B1 | 10/2002 | Teoman et al. |

(Continued)

FOREIGN PATENT DOCUMENTS

| | | |
|---|---|---|
| JP | 2009140356 | 6/2009 |
| JP | 2013152553 | 8/2013 |

(Continued)

OTHER PUBLICATIONS

U.S. Appl. No. 14/661,627, filed Mar. 18, 2015, Christopher Magee Greenwood, et al.

(Continued)

*Primary Examiner* — Nicholas R Taylor
*Assistant Examiner* — Chong G Kim
(74) *Attorney, Agent, or Firm* — Robert C. Kowert; Kowert, Hood, Munyon, Rankin & Goetzel, P.C.

(57) ABSTRACT

A distributed system may implement opportunistic resource migration to optimize resource placement. Resources may be placed amongst different resource hosts of a distributed system. An evaluation of the current placement may be performed according placement criteria that improve placement of the resources at the distributed system. Based on the evaluation, the prospective migration of resources that exceed an improvement threshold may be identified as candidate resources to migrate. Migration for the candidate resources may be opportunistically performed. In some embodiments, a priority may be assigned to the candidate resources according to which the candidate resources are selected for performing migration.

21 Claims, 10 Drawing Sheets

(58) Field of Classification Search
USPC .................................................... 709/226
See application file for complete search history.

(56) References Cited

U.S. PATENT DOCUMENTS

| | | | |
|---|---|---|---|
| 6,760,899 B1 | 7/2004 | Young et al. | |
| 6,922,724 B1 | 7/2005 | Freeman et al. | |
| 7,072,815 B1 | 7/2006 | Chaudhary et al. | |
| 7,146,522 B1 | 12/2006 | Rowe et al. | |
| 7,277,960 B2 | 10/2007 | Andrzejak et al. | |
| 7,426,570 B2 | 9/2008 | Andrzejak et al. | |
| 7,711,711 B1 | 5/2010 | Linnell et al. | |
| 7,895,261 B2 | 2/2011 | Jones et al. | |
| 7,984,151 B1 | 7/2011 | Raz et al. | |
| 8,219,693 B1* | 7/2012 | Deflaux | G06F 17/302 709/203 |
| 8,230,069 B2 | 7/2012 | Korupolu | |
| 8,280,853 B1 | 10/2012 | Lai et al. | |
| 8,285,687 B2 | 10/2012 | Voll et al. | |
| 8,307,362 B1* | 11/2012 | Gong | G06F 9/5077 718/1 |
| 8,321,862 B2 | 11/2012 | Swamy et al. | |
| 8,365,183 B2 | 1/2013 | Esfahany et al. | |
| 8,452,819 B1* | 5/2013 | Sorenson, III | G06F 3/0611 707/809 |
| 8,479,211 B1 | 7/2013 | Marshall | G06F 11/14 707/770 |
| 8,484,353 B1 | 7/2013 | Johnson et al. | |
| 8,533,103 B1* | 9/2013 | Certain | G06Q 10/06 705/35 |
| 8,539,197 B1* | 9/2013 | Marshall | G06F 13/00 711/112 |
| 8,583,867 B1 | 11/2013 | Radhakrishnan et al. | |
| 8,612,330 B1* | 12/2013 | Certain | G06Q 30/06 705/37 |
| 8,615,579 B1* | 12/2013 | Vincent | G06F 9/4856 709/223 |
| 8,615,589 B1* | 12/2013 | Adogla | G06F 9/5077 709/226 |
| 8,706,869 B2 | 4/2014 | Campion et al. | |
| 8,738,972 B1 | 5/2014 | Bakman et al. | |
| 8,762,538 B2 | 6/2014 | Dutta et al. | |
| 8,782,242 B2 | 7/2014 | Ahmad et al. | |
| 8,856,386 B2 | 10/2014 | Dutta et al. | |
| 8,868,963 B2* | 10/2014 | Fawcett | G06F 9/30007 709/223 |
| 8,924,539 B2 | 12/2014 | Ferris et al. | |
| 8,930,539 B1* | 1/2015 | Rajaa | G06F 9/4856 709/226 |
| 9,015,229 B1* | 4/2015 | Raz | G06F 9/5083 709/203 |
| 9,020,984 B1* | 4/2015 | Sorenson, III | G06F 3/0611 707/809 |
| 2002/0059253 A1 | 5/2002 | Albazz et al. | |
| 2003/0191930 A1 | 10/2003 | Viljoen et al. | |
| 2004/0078419 A1 | 4/2004 | Ferrari et al. | |
| 2004/0260873 A1 | 12/2004 | Watanabe | |
| 2005/0015547 A1* | 1/2005 | Yokohata | G06F 3/0605 711/114 |
| 2005/0228878 A1 | 10/2005 | Anstey et al. | |
| 2005/0267950 A1 | 12/2005 | Kitamura | |
| 2006/0031649 A1* | 2/2006 | Murotani | G06F 3/0605 711/162 |
| 2006/0069761 A1* | 3/2006 | Singh | H04L 67/1008 709/222 |
| 2007/0130566 A1* | 6/2007 | van Rietschote | G06F 9/45533 718/1 |
| 2008/0005468 A1 | 1/2008 | Faibish et al. | |
| 2008/0005508 A1 | 1/2008 | Asano et al. | |
| 2008/0052026 A1 | 2/2008 | Amidon et al. | |
| 2008/0059536 A1 | 3/2008 | Brock et al. | |
| 2008/0140905 A1 | 6/2008 | Okuyama | |
| 2008/0271039 A1 | 10/2008 | Rolia et al. | |
| 2008/0291204 A1 | 11/2008 | Korupolu et al. | |
| 2009/0132617 A1 | 5/2009 | Soran et al. | |
| 2009/0228535 A1* | 9/2009 | Rathi | G06F 3/048 |
| 2009/0228889 A1 | 9/2009 | Yoshida | |
| 2009/0235104 A1 | 9/2009 | Fung | |
| 2009/0249470 A1 | 10/2009 | Litvin et al. | |
| 2009/0307426 A1 | 12/2009 | Galloway et al. | |
| 2010/0037009 A1 | 2/2010 | Yano et al. | |
| 2010/0037031 A1 | 2/2010 | DeSantis et al. | |
| 2010/0070725 A1 | 3/2010 | Prahlad et al. | |
| 2010/0077158 A1 | 3/2010 | Asano et al. | |
| 2010/0107015 A1 | 4/2010 | Bernabeu-Auban et al. | |
| 2010/0191922 A1 | 7/2010 | Dickey et al. | |
| 2010/0312983 A1 | 12/2010 | Moon et al. | |
| 2010/0332657 A1* | 12/2010 | Elyashev | H04L 67/1002 709/226 |
| 2011/0004735 A1 | 1/2011 | Arroyo et al. | |
| 2011/0010518 A1* | 1/2011 | Kavuri | G06F 3/0647 711/165 |
| 2011/0060885 A1 | 3/2011 | Satoyama et al. | |
| 2011/0072208 A1* | 3/2011 | Gulati | G06F 3/0613 711/114 |
| 2011/0078303 A1* | 3/2011 | Li | G06F 9/505 709/224 |
| 2011/0238546 A1* | 9/2011 | Certain | G06Q 10/00 705/34 |
| 2011/0246526 A1 | 10/2011 | Finkelstein et al. | |
| 2012/0036249 A1* | 2/2012 | Chandrasekaran | G06F 9/5088 709/224 |
| 2012/0036515 A1* | 2/2012 | Heim | G06F 9/5088 718/105 |
| 2012/0042142 A1* | 2/2012 | Garman | G06F 9/5016 711/162 |
| 2012/0060006 A1 | 3/2012 | Paterson-Jones | |
| 2012/0079221 A1 | 3/2012 | Sivasubramanian et al. | |
| 2012/0084113 A1* | 4/2012 | Brandwine | G06Q 10/06312 705/7.22 |
| 2012/0089726 A1* | 4/2012 | Doddavula | H04L 67/34 709/224 |
| 2012/0102187 A1* | 4/2012 | Bargoti | G06F 3/061 709/224 |
| 2012/0131176 A1* | 5/2012 | Ferris | G06F 9/5072 709/224 |
| 2012/0151476 A1* | 6/2012 | Vincent | G06F 9/45558 718/1 |
| 2012/0221710 A1* | 8/2012 | Tsirkin | G06F 9/5077 709/224 |
| 2012/0226796 A1* | 9/2012 | Morgan | H04L 12/1453 709/224 |
| 2012/0254445 A1* | 10/2012 | Kawamoto | G06F 9/5077 709/226 |
| 2012/0254687 A1 | 10/2012 | Leggette et al. | |
| 2012/0272025 A1* | 10/2012 | Park | G06F 3/0608 711/162 |
| 2012/0284712 A1 | 11/2012 | Nimmagadda et al. | |
| 2012/0297238 A1* | 11/2012 | Watson | G06F 11/3442 714/4.11 |
| 2013/0041989 A1* | 2/2013 | Boss | G06F 9/505 709/223 |
| 2013/0046874 A1* | 2/2013 | Cohn | G06F 9/5061 709/223 |
| 2013/0046966 A1 | 2/2013 | Chu et al. | |
| 2013/0055260 A1* | 2/2013 | Zlotkin | G06F 9/4856 718/1 |
| 2013/0055277 A1* | 2/2013 | Ashish | G06F 9/5083 718/104 |
| 2013/0067267 A1 | 3/2013 | Tamhane et al. | |
| 2013/0091283 A1* | 4/2013 | Omar | H04L 41/0893 709/226 |
| 2013/0110778 A1* | 5/2013 | Taylor | G06F 17/30215 707/624 |
| 2013/0111032 A1* | 5/2013 | Alapati | G06F 9/5072 709/226 |
| 2013/0151683 A1* | 6/2013 | Jain | G06F 3/0611 709/223 |
| 2013/0204960 A1* | 8/2013 | Ashok | G06F 15/17 709/213 |

(56) References Cited

U.S. PATENT DOCUMENTS

| | | | | |
|---|---|---|---|---|
| 2013/0238572 | A1* | 9/2013 | Prahlad | G06F 17/30082 707/692 |
| 2013/0290539 | A1 | 10/2013 | Kodialam et al. | |
| 2013/0290941 | A1* | 10/2013 | Kruglick | G06F 9/45516 717/148 |
| 2013/0297905 | A1* | 11/2013 | Yang | G06F 12/02 711/165 |
| 2013/0304925 | A1 | 11/2013 | Ferris et al. | |
| 2013/0311616 | A1* | 11/2013 | Wang | G06F 17/302 709/219 |
| 2013/0311628 | A1 | 11/2013 | Kruglick | |
| 2014/0032767 | A1* | 1/2014 | Nelson | G06F 9/45558 709/226 |
| 2014/0136729 | A1* | 5/2014 | Chan | H04L 65/60 709/231 |
| 2014/0149986 | A1* | 5/2014 | S M | G06F 9/5083 718/1 |
| 2014/0165063 | A1* | 6/2014 | Shiva | G06F 9/45533 718/1 |
| 2014/0173229 | A1* | 6/2014 | Reohr | G06F 3/0611 711/162 |
| 2014/0201364 | A1* | 7/2014 | Yoshikawa | H04M 7/006 709/224 |
| 2014/0250440 | A1* | 9/2014 | Carter | G06F 9/5011 718/105 |
| 2014/0304437 | A1* | 10/2014 | Ashok | G06F 15/17 710/18 |
| 2015/0212840 | A1 | 7/2015 | Biran et al. | |
| 2015/0236977 | A1* | 8/2015 | Terayama | H04L 47/762 709/224 |
| 2015/0242150 | A1* | 8/2015 | Sorenson, III | G06F 3/0611 711/114 |
| 2015/0248305 | A1 | 9/2015 | Shu et al. | |
| 2015/0356078 | A1* | 12/2015 | Kishimoto | G06F 17/30079 707/610 |
| 2016/0004571 | A1* | 1/2016 | Smith | G06F 17/30598 718/105 |
| 2016/0007210 | A1 | 1/2016 | Batteram et al. | |
| 2016/0029769 | A1 | 2/2016 | Park et al. | |
| 2016/0070601 | A1* | 3/2016 | Yamamoto | G06F 9/5088 718/105 |
| 2016/0124735 | A1 | 5/2016 | Dingsor et al. | |
| 2016/0147553 | A1* | 5/2016 | Palavalli | G06F 21/121 718/1 |
| 2016/0154660 | A1 | 6/2016 | Clark et al. | |
| 2016/0188355 | A1* | 6/2016 | Cao | G06F 9/45558 718/1 |
| 2016/0191369 | A1* | 6/2016 | Kuranami | H04L 43/50 709/224 |

FOREIGN PATENT DOCUMENTS

| | | |
|---|---|---|
| KR | 10-2011-0034666 | 4/2011 |
| WO | 2010016104 | 11/2010 |
| WO | 2011/088261 | 7/2011 |
| WO | 2014073024 | 5/2014 |

OTHER PUBLICATIONS

U.S. Appl. No. 13/053,469, filed Mar. 22, 2011, James Christopher Sorenson, et al.
U.S. Appl. No. 13/903,670, filed May 28, 2013, James Christopher Sorenson, et al.
International Search Report and Written Opinion from PCT/US2016/021580, dated Jun. 2, 2016, Amazon Technologies, Inc., pp. 1-11.
Fetahi Wuhib, et al., "A Gossip Protocol for Dynamic Resource Management in Large Cloud Environments", IEEE Transactions on Network and Service Management, vol. 9, No. 2, Jun. 2012, pp. 213-225.
Hien Nguyen Van, et al., "SLA-aware Virtual Resource Management for Cloud Infrastructures", IEEE Ninth International Conference on Computer and Information Technology, 2009, pp. 357-362.
Fabien Hermenier, et al., "Entropy: a Consolidation Manger for Clusters", VEE'09: Proceeding of the 2009 ACM SIGPLAN/SIGOPS International Conference on Virtual Execution Environment, Mar. 11-13, 2009, pp. 41-50.
Fetahi Wuhib, et al., "Dynamic Resource Allocation with Management Objectives—Implementation for an OpenStack Cloud", KTH Technical Reports, May 28, 2012, pp. 1-8.
U.S. Appl. No. 14/658,941, filed Mar. 16, 2015, James Michael Thompson.
U.S. Appl. No. 14/643,906, filed Mar. 10, 2015, Christopher Magee Greenwood.
U.S. Appl. No. 13/465,998, filed May 7, 2012, Marc J. Brooker, et al.
U.S. Appl. No. 13/466,007, filed May 7, 2012, Marc J. Brooker, et al.
U.S. Appl. No. 13/466,010, filed May 7, 2012, Marc J. Brooker, et al.
U.S. Appl. No. 13/466,014, filed May 7, 2012, Marc J. Brooker, et al.
1U.S. Appl. No. 3/466,022, filed May 7, 2012, Marc J. Brooker, et al.
VMware; Carl Waldspurger; Memory Resource Management in WMware ESX Server; pp. 1-24, Dec. 10, 2002.
HP; Chris Hyser et al.; Autonomic Virtual Machine Placement in the Data Center; pp. 1-10, Feb. 26, 2008; HP Laboratories.
U.S. Appl. No. 12/892,742, filed Sep. 28, 2010, Swaminathan Sivasubramanian.
"Amazon EBS API and Command Overview", downloaded Jul. 11, 2013 from doc.aws.amazon.com/AWSEC2/latest/UserGuide/ebs-api-cli-overview.html, p. 1.
"AMI Basics" downloaded Jul. 11, 2013 from doc.aws.amazon.com/AWSEC2/latest/UserGuide/ComponentsAMIs.html, p. 1-2.
"AWS Amazon Elastic Block Store (EBS)—Persistent Storage" downloaded Jul. 11, 2013 from aws.amazon.com/ebs/, pp. 1-4.
"Cloudiquity" Published Mar. 12, 2009, Amazon Web Services and Cloud, pp. 1-4.
"Feature Guide: Elastic Block Store: Articles & Tutorials: Amazon Web Services" downloaded Jul. 11, 2013 from aws.amazon.com/articles/1667, pp. 1-7.
U.S. Appl. No. 14/028,186, filed Sep. 16, 2013, Marcin Piotr Kowalski.
U.S. Appl. No. 13/424,290, filed Mar. 19, 2012, Marc J. Brooker.
Office Action from Japanese Application No. 2017-546817, dated Dec. 4, 2018 (English translation and Japanese version), Amazon Technologies, Inc., pp. 1-5.
Office Action from Korean Application No. 10-2017-7024942, dated Jun. 14, 2018 (English Translation and Korean version), pp. 1-14.
Office Action from Patent Application No. 11201707091T, dated Apr. 30, 2018, Amazon Technologies, Inc., pp. 1-8.
U.S. Appl. No. 16/024,026, filed Jun. 29, 2018, Fan Ping et al.
Office Action from Japanese Application No. 2017-546817, dated Sep. 10, 2019, (Japanese version and English translation), pp. 1-5.
Office Action from Korean Application No. 10-2017-7024942, (Enlgish translation and Korean Version), pp. 1-14.
Rochman et al., "Efficient Resource Placement in Cloud Computing and Network Applications", 2013, pp. 1-30.
Rochman et al., "Resource Placement and Assignment in Distributed Network Topologies", 2013, pp. 1-13.

* cited by examiner migration operation queue 400

| Volume Identifier | Destination Host | State | Last Update | Priority |
|---|---|---|---|---|
| vol-A | 1.1.1.1 | in-progress | 14:35:06 | 100 |
| vol-B | 2.2.2.2 | complete | 14:24:11 | 85 |
| vol-C | 3.3.3.3 | ready | 14:24:11 | 65 |
| vol-D | 4.4.4.4 | fail | 14:24:11 | 60 |
| ... | ... | ... | ... | ... | migration operation 402
migration operation 404
migration operation 406
migration operation 408

FIG. 4

OPPORTUNISTIC RESOURCE MIGRATION TO OPTIMIZE RESOURCE PLACEMENT

BACKGROUND

The recent revolution in technologies for dynamically sharing virtualizations of hardware resources, software, and information storage across networks has increased the reliability, scalability, and cost efficiency of computing. More specifically, the ability to provide on demand virtual computing resources and storage through the advent of virtualization has enabled consumers of processing resources and storage to flexibly structure their computing and storage costs in response to immediately perceived computing and storage needs. Virtualization allows customers to purchase processor cycles and storage at the time of demand, rather than buying or leasing fixed hardware in provisioning cycles that are dictated by the delays and costs of manufacture and deployment of hardware. Rather than depending on the accuracy of predictions of future demand to determine the availability of computing and storage, users are able to purchase the use of computing and storage resources on a relatively instantaneous as-needed basis.

Virtualized computing environments may provide various guarantees as to the availability and durability of computing resources. Distributing computing resources amongst multiple resource hosts may provide different availability and durability characteristics. For example, virtual computing resources may provide block-based storage. Such block-based storage provides a storage system that is able to interact with various computing virtualizations through a series of standardized storage calls that render the block-based storage functionally agnostic to the structural and functional details of the volumes that it supports and the operating systems executing on the virtualizations to which it provides storage availability. In order to provide block-based storage, various different placement optimizations and/or constraints may be implemented in order to provide performance guarantees. When placing block-based storage resources amongst resource hosts, selecting from among different placement options that satisfy the optimizations and/or constraints to place storage may prove challenging.

BRIEF DESCRIPTION OF THE DRAWINGS

FIG. 4 is a logical block diagram illustrating a migration queue for optimistic resource migration, according to some embodiments.

Figure 1:
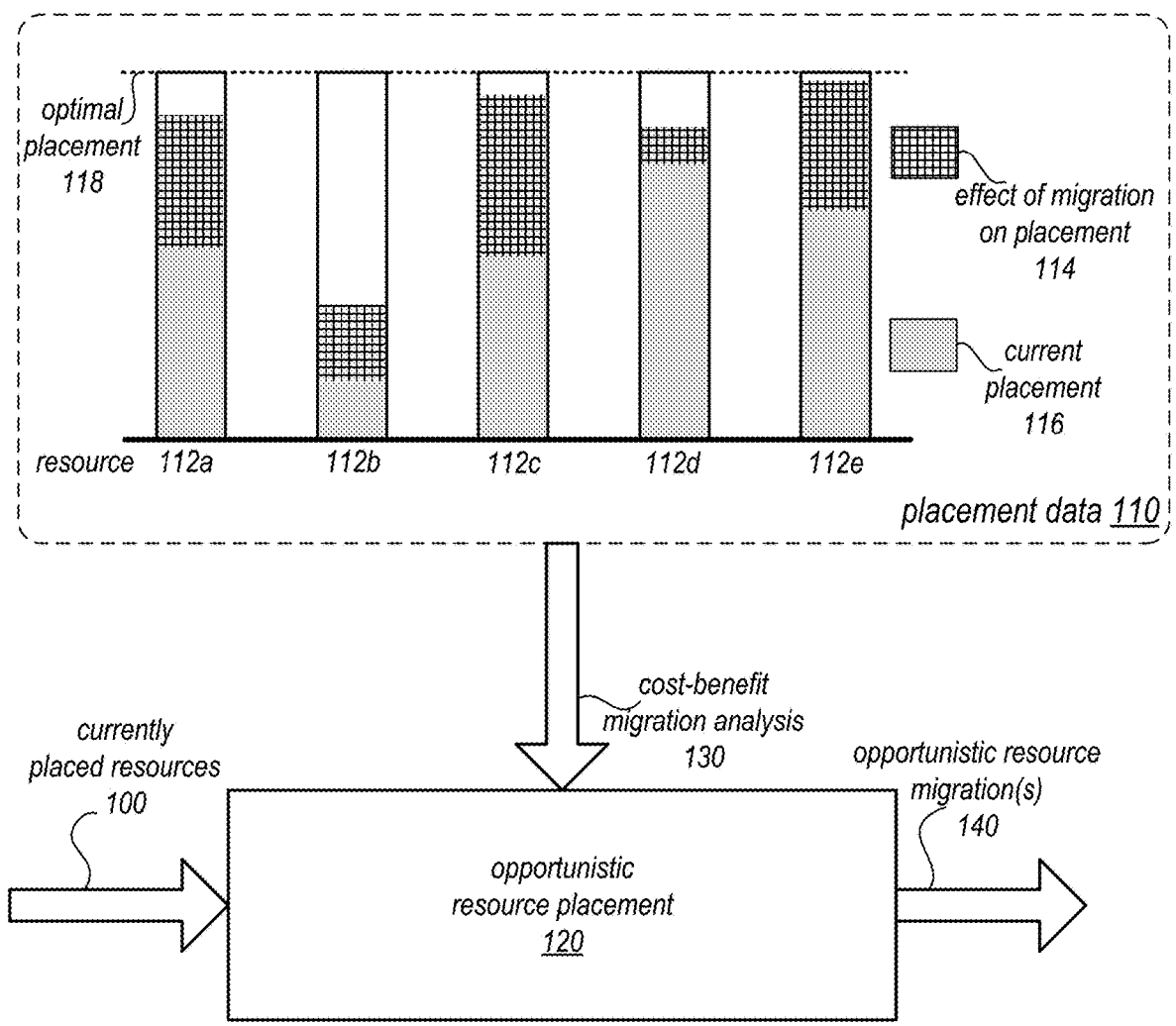
FIG. 1 illustrates a logical block diagram for opportunistic resource migration to optimize resource placement, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may implement opportunistic resource migration for resource placement. Distributed systems may host various resources for performing or implementing different systems, services, applications and/or functions. Some resources may be part of a larger distributed resource, located at multiple resources amongst different resource hosts. Other resources may be individual or stand-alone. Resources may be one of many different types of resources, such as one of various types of physical or virtualized computing resources, storage resources, or networking resources. For example, a storage service may host different replicas of data across a number of different resource hosts.

Placement decisions may be made to locate the resources at different resource hosts during creation. However, waiting to place resources until an optimal location is available may be difficult, as resources may need to be placed in order to begin operation. Instead, initial placements of resources at resource hosts may be made according to the best available placement. Over time sub-optimal placements (even if the placements were the best location for a resource at the time of initial placement) may add up to significant costs, such as underutilized resource hosts, inefficient or less durable configurations for distributed resources, and/or various other kinds of waste or inefficiency for the resource or distributed system as a whole.

Placement decisions may be made according to placement criteria, in some embodiments. Placement criteria may be used to determine a best or optimal placement location for an individual resource, as well as for placement of resources across the distributed system as a whole. For example, in order to provide or improve availability, durability, and/or other performance characteristics of resources, placement criteria may be used to determine particular locations at which resources should be placed (e.g., different infrastructure zones such as network router or brick). If no such location is available, then the placement criteria may indicate a less optimal location to place the resource (e.g., a resource host that is in a less efficient infrastructure zone, such as a different network router or brick than another resource with which the placed resource communicates). Placement criteria may include, but are not limited to, a configuration of the resource along with other resources if part of a distributed resource, available bytes, IOPs, or slots, a resource utilization balance, such as bytes to IOPs balance, impact on capacity fragmentation, hardware/software characteristics, and/or various desired location-based configurations.

FIG. 1 illustrates a logical block diagram for opportunistic resource migration to optimize resource placement, according to some embodiments. Opportunistic resource placement 120 may evaluate currently placed resources 100 in order to perform opportunistic resource migration(s) 140 so that resources in the distributed system may be migrated to other resource hosts which are a better placement either for the individual resources and/or for the overall placement of resources in the distributed system. Resource hosts, which may be one or more computing systems, nodes, or devices (e.g., system 1000 in FIG. 10 below) may be configured to host or implement a resource of the distributed system.

Opportunistic resource placement 120 may obtain information about currently placed resources, such as information about the configuration of the resource (e.g., individual or part of a distributed resource, size, performance characteristics, etc.), about the resource host (e.g., number of resources hosted, resource utilization (e.g., processing, network, storage, bandwidth, etc.), hardware/software configuration, or any other data for determining the state of the resource host and its capabilities to host). A cost-benefit migration analysis 130 may be performed to identify resources as candidate resources for opportunistic migration. The cost benefit migration analysis 130 may be performed to identify candidate resources for migration where the prospective migrations would improve placement for the migrated resources, other resources that are not migrated, and/or more general placement of resources in the distributed system. For example, placement data 110 illustrates the optimality of resources 112a, 112b, 112c, 112d, and 112e. The graph represents a score, percentage or other indication of the current placement 116 of a resource compared with an optimal placement 118. In at least some embodiments, a placement score or other metric may be generated for each resource 112. A similar evaluation may be made with respect to resource hosts which may be available to host the resource. The effect of a possible placement of the resource at the available resource hosts may be determined by generating a placement score for the available resource hosts that hypothetically includes the resources. This effect of migration on the placement score of a resource 114 is illustrated as an addition to (e.g., an improvement to) the graphs for each resource 112.

Migration operations to move resources may have some costs. Therefore, the cost of performing a migration operation to move a resource to a better placed location may be weighed against the benefit provided by the migration. For instance, an improvement optimization threshold may be implemented which can identify those resources for which the migration operation benefit outweighs the cost to perform the migration. Though resource 112b has the worst current placement with respect to the other resources 112, the effect of migration to improve the placement may not be as much as for other resources, such as resources 112a, 112c, and 112e. It may be that the amount of improvement for resource 112b (and 112d) may not exceed the improvement threshold.

Similar analyses may be made with respect to measures or scores (not illustrated) which reflect the overall placement of resources in the distributed system. For instance, the effect of migrating a resource like resource 112a upon a migration score for the placement overall may be compared with the optimization threshold to determine if the benefit to the overall placement is worth the cost to perform the migration operation. Likewise, the same analysis may be performed with respect to the migrations impact on other individual or groups of resources, examining whether a prospective migration of one resource improves placement of another resources in excess of an improvement threshold to perform the migration.

Opportunistic resource migration(s) 140 may be performed for those candidate resources which have been identified as part of cost-benefit migration analysis 130. Opportunistic resource migration(s) 140 may be scheduled or directed in such a way as to not interfere with the operation of the resources themselves (e.g., opportunistic resource migration(s) 140 may be performed as part of a background process or service). In at least some embodiments, priorities may be assigned to migrations so that migrations which have greater or more beneficial effect are performed sooner (e.g., a migration for resource 112c before a migration for resource 112e).

Over time dynamically performing opportunistic resource migration may rebalance placements of resource in a distributed system to optimal locations, achieving greater efficiency, durability, availability, or any other performance goal that placement criteria are designed to achieve for the resources and distributed system. For example distributed resources (e.g., master and slave pairs or groups of peer nodes) may have optimal configurations with respect to other members of the distributed resource which are not achieved at initial placement which may be ultimately achieved as a result of opportunist resource migration. Moreover barriers to such optimal placements may be removed by migrating other resources (even to less optimal locations for the other resources if the migration is better for some resources or the distributed system overall). For instance, a resource host that is unable to host additional resources may be identified as a location that could provide optimal placements for other resources that are currently suboptimal. The resources may be identified as candidate resources and migrated to make the resource host available to remedy the suboptimal placements (even though the resources moved off the host may be placed in the same level of optimality or less optimal locations) by hosting the other resources. Desirable configurations for individual resources may also be obtained. In some embodiments placements with respect to infrastructure zones may be highly desirable, and implementing opportunistic resource migration may allow migrations to different resource hosts to locate resources in optimal infrastructure zones.

Please note that previous descriptions are not intended to be limiting, but are merely provided as an example of opportunistic resource migration for resource placement. Various components may perform resource placement. Different numbers or types of resources and placement data may be employed.

This specification begins with a general description of a provider network, which may implement opportunistic resource migration for resource placement offered via one or more network-based services in the provider network, such as opportunistic migration for data volumes offered via a block-based storage service. Then various examples of a block-based storage service are discussed, including different components/modules, or arrangements of components/module that may be employed as part of volume placement for data volumes in the block-based storage service. A number of different methods and techniques to implement opportunistic resource migration for resource placement are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
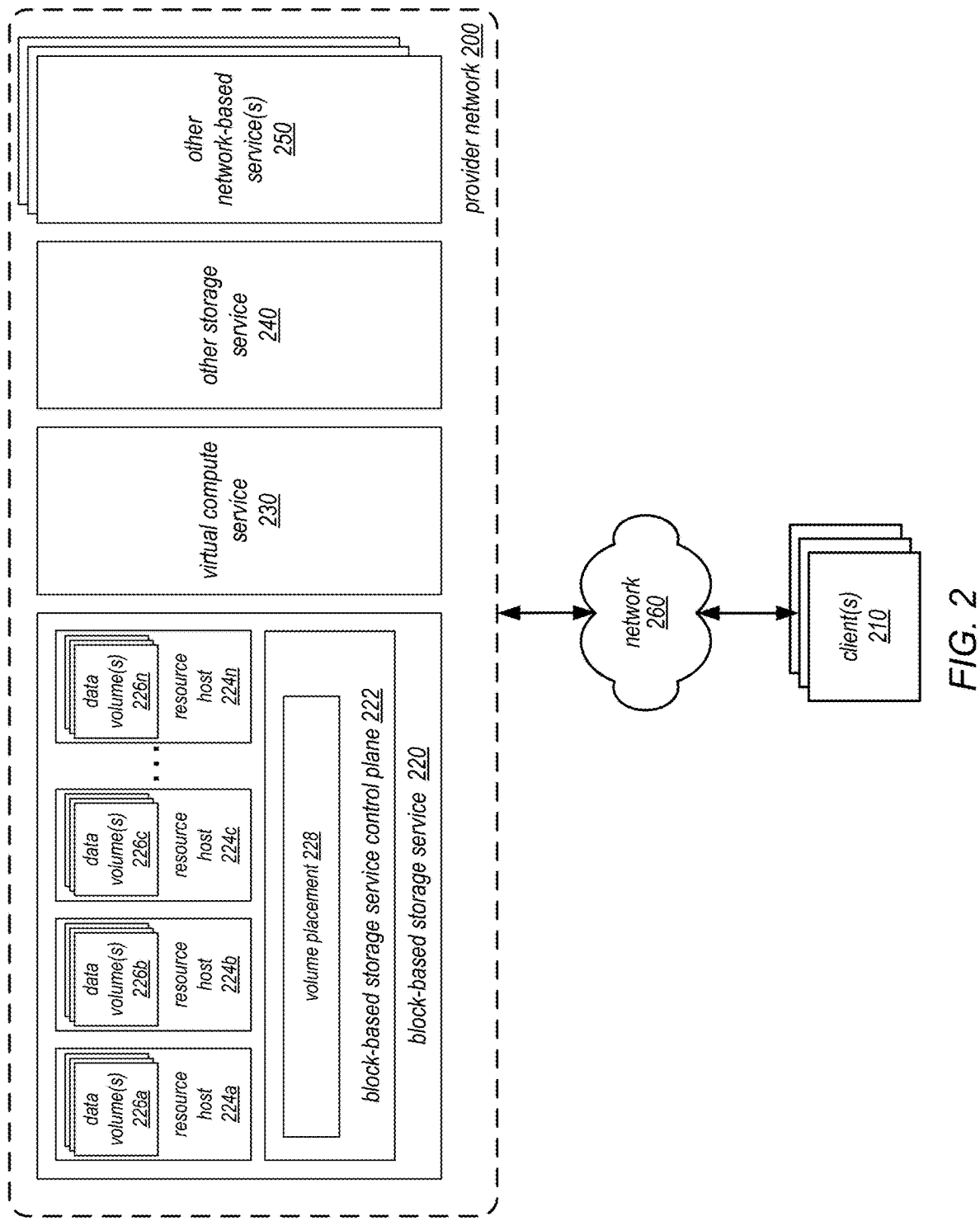
FIG. 2 is a block diagram illustrating a provider network that includes multiple network-based services such as a block-based storage service that implements opportunistic resource migration to optimize resource placement, according to some embodiments.

FIG. 2 is a block diagram illustrating a provider network implementing multiple network-based services including a block-based storage service that implements opportunistic resource migration for resource placement, according to some embodiments. Provider network 200 may be set up by an entity such as a company or a public sector organization to provide one or more services (such as various types of cloud-based computing or storage) accessible via the Internet and/or other networks to clients 210. Provider network 200 may include numerous data centers hosting various resource pools, such as collections of physical and/or virtualized computer servers, storage devices, networking equipment and the like (e.g., computing system 1000 described below with regard to FIG. 10), needed to implement and distribute the infrastructure and services offered by the provider network 200. In some embodiments, provider network 200 may provide computing resources, such as virtual compute service 230, storage services, such as block-based storage service 220 and other storage service 240 (which may include various storage types such as object/key-value based data stores or various types of database systems), and/or any other type of network-based services 250. Clients 210 may access these various services offered by provider network 200 via network 260. Likewise network-based services may themselves communicate and/or make use of one another to provide different services. For example, computing resources offered to clients 210 in units called "instances," such as virtual or physical compute instances or storage instances, may make use of particular data volumes 226, providing virtual block storage for the compute instances.

As noted above, virtual compute service 230 may offer various compute instances to clients 210. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the compute instances of virtual compute service 230 in different embodiments, including special purpose computer servers, storage devices, network devices and the like. In some embodiments instance clients 210 or other any other user may be configured (and/or authorized) to direct network traffic to a compute instance. In various embodiments, compute instances may attach or map to one or more data volumes 226 provided by block-based storage service 220 in order to obtain persistent block-based storage for performing various operations.

Compute instances may operate or implement a variety of different platforms, such as application server instances, Java™ virtual machines (JVMs), special-purpose operating systems, platforms that support various interpreted or compiled programming languages such as Ruby, Perl, Python, C, C++ and the like, or high-performance computing platforms) suitable for performing client applications, without for example requiring the client 210 to access an instance. In some embodiments, compute instances have different types or configurations based on expected uptime ratios. The uptime ratio of a particular compute instance may be defined as the ratio of the amount of time the instance is activated, to the total amount of time for which the instance is reserved. Uptime ratios may also be referred to as utilizations in some implementations. If a client expects to use a compute instance for a relatively small fraction of the time for which the instance is reserved (e.g., 30%-35% of a year-long reservation), the client may decide to reserve the instance as a Low Uptime Ratio instance, and pay a discounted hourly usage fee in accordance with the associated pricing policy. If the client expects to have a steady-state workload that requires an instance to be up most of the time, the client may reserve a High Uptime Ratio instance and potentially pay an even lower hourly usage fee, although in some embodiments the hourly fee may be charged for the entire duration of the reservation, regardless of the actual number of hours of use, in accordance with pricing policy. An option for Medium Uptime Ratio instances, with a corresponding pricing policy, may be supported in some embodiments as well, where the upfront costs and the per-hour costs fall between the corresponding High Uptime Ratio and Low Uptime Ratio costs.

Compute instance configurations may also include compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, such as a particular number of virtual CPU cores, memory, cache, storage, as well as any other performance characteristic. Configurations of compute instances may also include their location, in a particular data center, availability zone, geographic, location, etc. . . . and (in the case of reserved compute instances) reservation term length.

In various embodiments, provider network 200 may also implement block-based storage service 220 for performing storage operations. Block-based storage service 220 is a storage system, composed of a pool of multiple independent resource hosts 224a, 224b, 224c through 224n(e.g., server block data storage systems), which provide block level storage for storing one or more sets of data volumes data volume(s) 226a, 226b, 226c, through 226n. Data volumes 226 may be mapped to particular clients (e.g., a virtual compute instance of virtual compute service 230), providing virtual block-based storage (e.g., hard disk storage or other persistent storage) as a contiguous set of logical blocks. In some embodiments, a data volume 226 may be divided up into multiple data chunks or partitions (including one or more data blocks) for performing other block storage operations, such as snapshot operations or replication operations. A volume snapshot of a data volume 226 may be a fixed point-in-time representation of the state of the data volume 226. In some embodiments, volume snapshots may be stored remotely from a resource host 224 maintaining a data volume, such as in another storage service 240. Snapshot operations may be performed to send, copy, and/or otherwise preserve the snapshot of a given data volume in another storage location, such as a remote snapshot data store in other storage service 240.

Block-based storage service 220 may implement block-based storage service control plane 222 to assist in the operation of block-based storage service 220. In various embodiments, block-based storage service control plane 222 assists in managing the availability of block data storage to clients, such as programs executing on compute instances provided by virtual compute service 230 and/or other network-based services located within provider network 200 and/or optionally computing systems (not shown) located within one or more other data centers, or other computing systems external to provider network 200 available over a network 260. Access to data volumes 226 may be provided over an internal network within provider network 200 or externally via network 260, in response to block data transaction instructions.

Block-based storage service control plane 222 may provide a variety of services related to providing block level storage functionality, including the management of user accounts (e.g., creation, deletion, billing, collection of payment, etc.). Block-based storage service control plane 222 may further provide services related to the creation, usage and deletion of data volumes 226 in response to configuration requests. In at least some embodiments, block-based storage service control plane 222 may implement volume placement 228, such as described in further detail below with regard to FIG. 3. Block-based storage service control plane 222 may also provide services related to the creation, usage and deletion of volume snapshots on other storage service 240. Block-based storage service control plane 222 may also provide services related to the collection and processing of performance and auditing data related to the use of data volumes 226 and snapshots of those volumes.

Provider network 200 may also implement another storage service 240, as noted above. Other storage service 240 may provide a same or different type of storage as provided by block-based storage service 220. For example, in some embodiments other storage service 240 may provide an object-based storage service, which may store and manage data as data objects. For example, volume snapshots of various data volumes 226 may be stored as snapshot objects for a particular data volume 226. In addition to other storage service 240, provider network 200 may implement other network-based services 250, which may include various different types of analytical, computational, storage, or other network-based system allowing clients 210, as well as other services of provider network 200 (e.g., block-based storage service 220, virtual compute service 230 and/or other storage service 240) to perform or request various tasks.

Clients 210 may encompass any type of client configurable to submit requests to network provider 200. For example, a given client 210 may include a suitable version of a web browser, or may include a plug-in module or other type of code module configured to execute as an extension to or within an execution environment provided by a web browser. Alternatively, a client 210 may encompass an application such as a database application (or user interface thereof), a media application, an office application or any other application that may make use of compute instances, a data volume 226, or other network-based service in provider network 200 to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, clients 210 may be configured to generate network-based services requests according to a Representational State Transfer (REST)-style network-based services architecture, a document- or message-based network-based services architecture, or another suitable network-based services architecture. In some embodiments, a client 210 (e.g., a computational client) may be configured to provide access to a compute instance or data volume 226 in a manner that is transparent to applications implement on the client 210 utilizing computational resources provided by the compute instance or block storage provided by the data volume 226.

Clients 210 may convey network-based services requests to provider network 200 via external network 260. In various embodiments, external network 260 may encompass any suitable combination of networking hardware and protocols necessary to establish network-based communications between clients 210 and provider network 200. For example, a network 260 may generally encompass the various telecommunications networks and service providers that collectively implement the Internet. A network 260 may also include private networks such as local area networks (LANs) or wide area networks (WANs) as well as public or private wireless networks. For example, both a given client 210 and provider network 200 may be respectively provisioned within enterprises having their own internal networks. In such an embodiment, a network 260 may include the hardware (e.g., modems, routers, switches, load balancers, proxy servers, etc.) and software (e.g., protocol stacks, accounting software, firewall/security software, etc.) necessary to establish a networking link between given client 210 and the Internet as well as between the Internet and provider network 200. It is noted that in some embodiments, clients 210 may communicate with provider network 200 using a private network rather than the public Internet.

Figure 3:
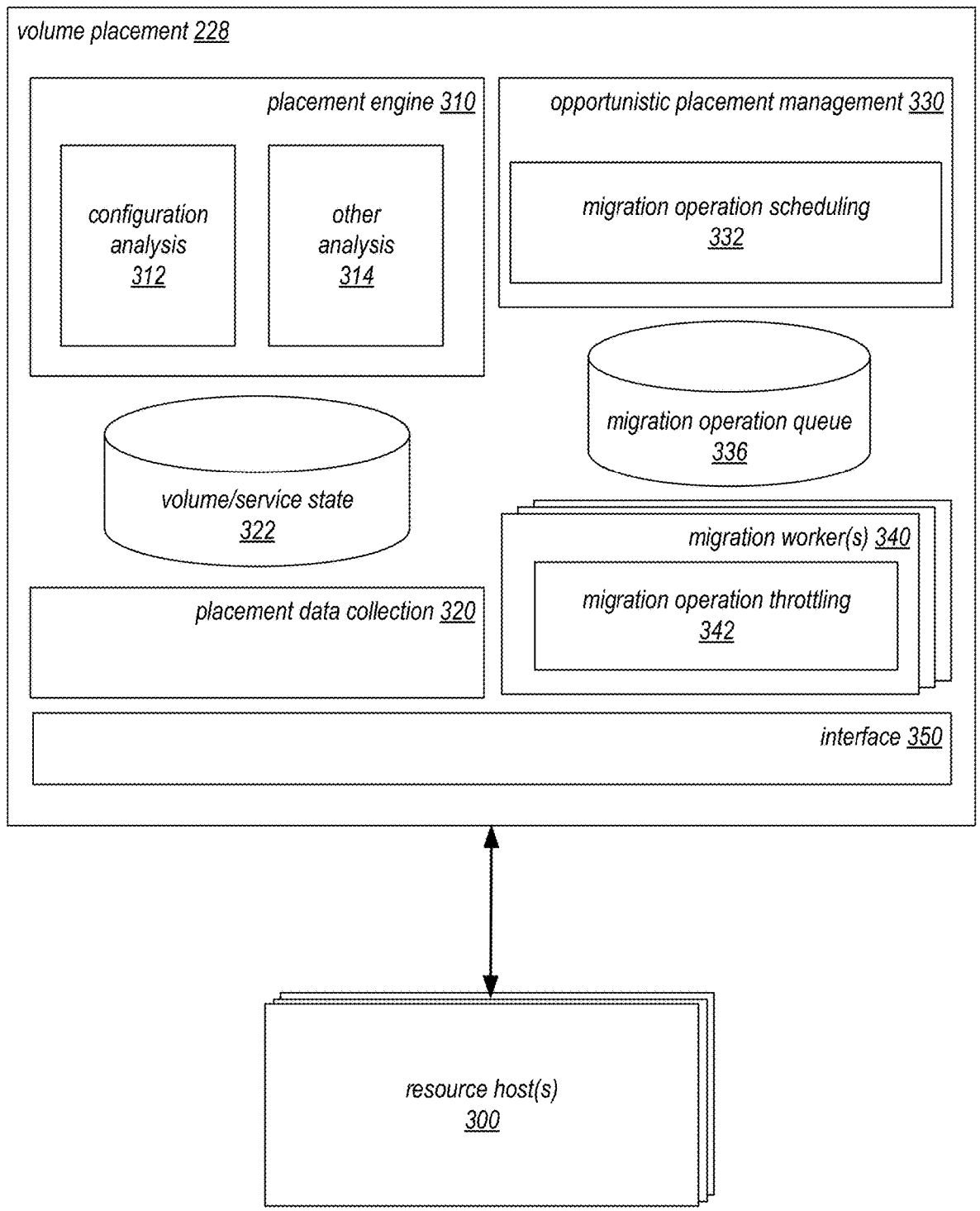
FIG. 3 is a logical block diagram illustrating volume placement that implements opportunistic resource migration to optimize resource placement, according to some embodiments.

FIG. 3 is a logical block diagram illustrating volume placement that implements opportunistic resource migration to optimize resource placement, according to some embodiments. As noted above, multiple resource hosts, such as resource hosts 300, may be implemented in order to provide block-based storage services. A resource host may be one or more computing systems or devices, such as a storage server or other computing system (e.g., computing system 1000 described below with regard to FIG. 10). Each resource host may maintain respective replicas of data volumes. Some data volumes may differ in size from other data volumes, in some embodiments. Resource hosts may also provide multi-tenant storage. For example, in some embodiments, one resource host may maintain a data volume for one account of block-based storage service 220, while another data volume maintained at the same resource host may be maintained for a different account. Resource hosts may persist their respective data volumes in one or more block-based storage devices (e.g., hard disk drives, solid state drives, etc.) that may be directly attached to a computing system or device implementing the respective resource host. Resource hosts may implement different persistent storage devices. For example, some resource hosts may implement solid state drives (SSDs) for persistent block storage, while other resource hosts may implement hard disk drives (HDDs) or other magnetic-based persistent storage devices. In this way different volume types, specifications, and other performance characteristics may be provided according to the persistent storage devices implemented at the resource host.

Block-based storage service 220 may manage and maintain data volumes in a variety of different ways. Different durability schemes may be implemented for some data volumes among two or more resource hosts as a distributed resource maintaining a same replica of a data volume at different partitions of the data volume. For example, different types of mirroring and/or replication techniques may be implemented (e.g., RAID 1) to increase the durability of a data volume, such as by eliminating a single point of failure for a data volume. In order to provide access to a data volume, resource hosts may then coordinate I/O requests, such as write requests, among the two or more resource hosts maintaining a replica of a data volume. For example, for a given data volume, one resource host may serve as a master resource host. A master resource host may, in various embodiments, receive and process requests (e.g., I/O requests) from clients of the data volume. Thus, the master resource host may then coordinate replication of I/O requests, such as write requests, or any other changes or modifications to the data volume to one or more other resource hosts serving as slave resource hosts. Thus, when a write request is received for the data volume at a master resource host, the master resource host may forward the write request to the slave resource host(s) and wait until the slave resource host(s) acknowledges the write request as complete before completing the write request at the master resource host. Master resource hosts may direct other operations for data volumes, like snapshot operations or other I/O operations (e.g., serving a read request).

Please note, that in some embodiments, the role of master and slave resource hosts may be assigned per data volume. For example, for a data volume maintained at one resource host, the resource host may serve as a master resource host. While for another data volume maintained at the same resource host, the resource host may serve as a slave resource host. Resource hosts may implement respective I/O managers. The I/O managers may handle I/O requests directed toward data volumes maintained at a particular resource host. Thus, I/O managers may process and handle a write request to volume at resource host, for example. I/O managers may be configured to process I/O requests according to block-based storage service application programming interface (API) and/or other communication protocols, such as such as internet small computer system interface (iSCSI).

Resource hosts may be located within different infrastructure zones. Infrastructure zones may be defined by devices, such as server racks, networking switches, routers, or other components, power sources (or other resource host suppliers), or physical or geographical locations (e.g., locations in a particular row, room, building, data center, fault tolerant zone, etc.). Infrastructure zones may vary in scope such that a resource host (and replicas of data volumes implemented on the resource host) may be within multiple different types of infrastructure zones, such as a particular network router or brick, a particular room location, a particular site, etc.

Block-based storage service control plane 222 may implement volume placement 228, in various embodiments. Volume placement 228 may be implemented at one or more computing nodes, systems, or devices (e.g., system 1000 in FIG. 10). In at least some embodiments, volume placement 228 may implement placement data collection 320 to collect information, metrics, metadata, or any other information for performing volume placement. Placement data collection 320 may periodically sweep resource host(s) 300 with a query for the information, metrics, or metadata. For example, resource hosts may provide current utilization metrics, ongoing tasks or operations (e.g., such as migration or remirror tasks), and any other state information for the resource host, including volume specific information for volumes residing at the resource hosts. In some embodiments, placement data collection 320 may aggregate the data according to infrastructure zones, partitions, resource hosts, or other granularities for block-based storage service 220. Placement data collection 320 may store the data at volume/service state store 322, which may persistently maintain the collected data. In some embodiments volume/service state store 322 may be implemented as a database or otherwise searchable/query-able storage system to provide access to other components of volume placement 228 or block-based storage service control plane 226.

Volume placement 228 may implement placement engine 310, in various embodiments. Placement engine 310 may perform various kinds of analysis to identify placement locations for resources, such as replicas of new data volumes or migrating currently placed data volumes. Analysis may be performed with respect to the placement criteria, discussed above, to determine placement locations which may be optimal for individual resources, or for the block-based storage service as a whole. For instance, placement engine 310 may implement configuration analysis 312 to evaluate prospective placement configurations of all of the resources in a distributed resource, such as the placement of master, slave(s) of a data volume. In some embodiments, a client or other user of a distributed resource (or resource of the distributed resource) may be considered in the configuration analysis (e.g., evaluating the placement configuration including a virtual instance attached to a data volume). Configuration analysis 312 may consider the impact of migrating currently placed resources to other resource hosts in order to free up space at resource hosts that would provide better configurations for other resources of a distributed resource. For example, this could include moving a slave volume (e.g., the resource) to another resource host to make room for a different slave volume at that host, which would make the different slave volume in the same infrastructure zone as a master of the volume or a client of the volume. In some circumstances, this configuration (e.g., having the master or slave volume in the same infrastructure zone, such as being connected to the same network router, as the client) provides improved performance and may be an optimal configuration.

In response to receiving a placement request at placement engine 310, configuration analysis 312 may determine prospective placements by accessing volume/service state 322. Those resource hosts which are available, and which do not violate any placement constraints may be evaluated (e.g., two partitions of a data volume cannot be hosted by the same resource host, resource hosts with enough capacity, or resource hosts that implement particular hardware and/or software). In some embodiments, a subset of available resource hosts may be evaluated for placement decisions (as evaluating a very large pool of available resource hosts may be too computationally expensive). Prospective placement configurations may be generated or identified based on the available resource hosts for the resource. Other replicas of the data volume may be evaluated based on actual or hypothetical placement locations.

One or more infrastructure zone localities may be determined for the different prospective placement configurations of a distributed, in various embodiments, based on volume/service state 332. For instance, metadata may indicate which network bricks or routers the resource hosts of different replicas of a data volume are connected to. In at least some embodiments, a score may be generated for the infrastructure zone locality of a prospective placement configuration (where the resource to be placed is located at a different available resource host). Placement engine 310 may perform configuration analysis 312 upon many other metrics, data, or considerations besides infrastructure zone localities. For example, in at least some embodiments, an analysis may be performed on prospective configurations with respect to different performance metrics of the resource hosts hosting the replicas of a data volume. For example, storage capacity, workload, or Input/Output Operations per second (IOPs), may be evaluated for the data volume as a whole. Some data volumes may be partitioned so that different partitions maintain different portions of data for a data volume. For example, a data volume may be partitioned into 3 sets of master-slave replica pairs. Configuration analysis 312 may be performed based on the placement configuration for each portion of the data volume that is replicated (e.g., each master-slave replica pair) or all of the data volume partitions (e.g., all 3 of the master-slave replica pairs).

Placement engine 310 may implement other analysis 314 to determine partition placements. For example, scores may be generated for placements based on the last time a particular resource host was contacted or heard from. Analysis may be performed to identify and prevent multiple master-slave replica pairs from being placed on the same two resource hosts. In some embodiments, resource host fragmentation analysis may be performed, to optimize placement of resources on resource hosts that can host the partition and leave the least amount of space underutilized. As with configuration analysis above, the example analysis given above may be performed to determine placement locations for some resources which if migrated would may provide better placement of other resources that were not moved.

In some embodiments, volume placement 228 may implement opportunistic placement manager 330. Opportunistic placement management 330 may dynamically or proactively migrate currently placed resources (e.g., volume replicas) from one resource host to another resource host so that the placement for the resource (e.g., data volume) is more optimal and/or placement of resources amongst the resource host(s) 310 is more optimal as a whole (even if the migration results in a same or less optimal new placement for the migrated resource). For example, opportunistic placement manager 330 may implement migration operation scheduling 332 to request placements for resources from placement engine 310 that are determined to be placed sub-optimally (e.g., a lower scoring infrastructure zone category), such as discussed below with regard to FIGS. 6 and 7. Migration operation scheduling 332 may then determine which placements if performed would exceed a migration optimization or other improvement threshold (e.g., a difference between a current placement score and new placement score). For those resources with possible placements that would exceed the placement optimization threshold, migration operation scheduling 332 may place a migration operation for the partition in migration operation queue 336. In some embodiments, migration operation scheduling 332 may assign a priority to migration operations, so that more beneficial migration operations are performed sooner.

The performance of migration operations to migrate resources from one resource host to another may be asynchronous. To coordinate the scheduling and/or performing of different migration operations, a scheduling structure or other data set may be maintained. In some embodiments, a queue of migration operations, such as migration operations queue 336 may be implemented. FIG. 4 is a logical block diagram illustrating a migration queue for optimistic resource migration, according to some embodiments.

Migration operation queue 400 may be maintained in persistent storage, such as distributed or centralized data store. In at least some embodiments, a database system or other storage system that provides transaction controls may be utilized to maintain migration operation queue. For example, migration operation queue 400 may be maintained as a database table in another network-based service, such as a NoSQL data store implemented as part of other storage service 240. Migration operation scheduling 332 may update migration operation queue 400 periodically, according to the various techniques described below with regard to FIGS. 6-9. For example, migration operation 404 may have state changed from "in-progress" to complete. Various metadata and information for a migration operation may be maintained, such as a volume identifier, location of a destination host, state, time of last update, and/or priority value.

Migration operation scheduling 332 may also remove migration operations from queue 400, such as those migration operations identified as complete or failed, (e.g., migration operations 404 and 408. Those migration operations that have not yet been performed may have updated priorities stored in the queue (e.g., raising or lowing the priority value). Time of last update may indicate when an update to the migration operation in the queue was last made. For example, migration operation 502 has a later update time (14:34:06) than other migration operations, 504, 506, and 508, and thus may be considered to have more recent/relevant data. As discussed below with regard to FIG. 7, priority values may be assigned to migration operations in order to schedule the migration operations opportunistically. In at least some embodiments, migration operation queue 400 may be implemented as a priority queue, and thus the highest priority migration operation may be selected for performance.

Turning back to FIG. 3, migration worker(s) 340 may be implemented to perform migration operations. Migration worker(s) 340 may send a request to opportunistic placement manger 330 for a migration operation to perform. Opportunistic placement manger 330 may pull a migration operation from migration operation queue 336 and assign the migration operation to a migration worker 340 to direct. Alternatively, migration workers may directly access migration operation queue 336 to identify migration operations to perform, in some embodiments. Migration worker(s) 340 may, in some embodiments, update metadata for a migration operation in migration operation queue 336 (e.g., to change state from "ready" to "in progress").

In some embodiments, migration operation throttling 342 may be implemented to control the number of ongoing migration operations. Placement data collection 320 may track, maintain, or monitor current migration operations that are ongoing at resource host(s) 310, along with other data, such as network utilization, resource host utilization, or any other operational metrics and update volume/service state 322. Migration worker(s) 340 may access volume/service state 322 to determine whether a migration operation should be throttled according to some migration limit. For example, in some embodiments, network localities, which may include one or more resource host(s) 310, networking device(s), router(s), switches, power source(s), or other component or device of a virtual block-based storage service may be evaluated with respect to the effect of performing the identified resource migration operation. Different migration limits (e.g., number of migration operations, network utilization, resource host utilization, etc.) may be enforced with respect to the network localities. If the migration operation exceeds the limit for one of the different network localities, then the migration worker may throttle performance of the migration operation (e.g., the migration operation may be denied or delayed). In some embodiments, migration operation throttling may be limited to specific infrastructure zones or network localities (e.g., to the infrastructure zones or network localities which would be involved with perform a migration, such as zones that include the current and destination resource hosts of a migration operation). In some embodiments, opportunistic placement management 330 may perform migration operation throttling in addition to, or in place of migration worker(s) 340.

In various embodiments, migration worker 340 may request an updated placement for a resource that is to be migrated from placement engine 310, which may perform the various techniques discussed above and below to provide a new placement location for the resource.

Figure 5:
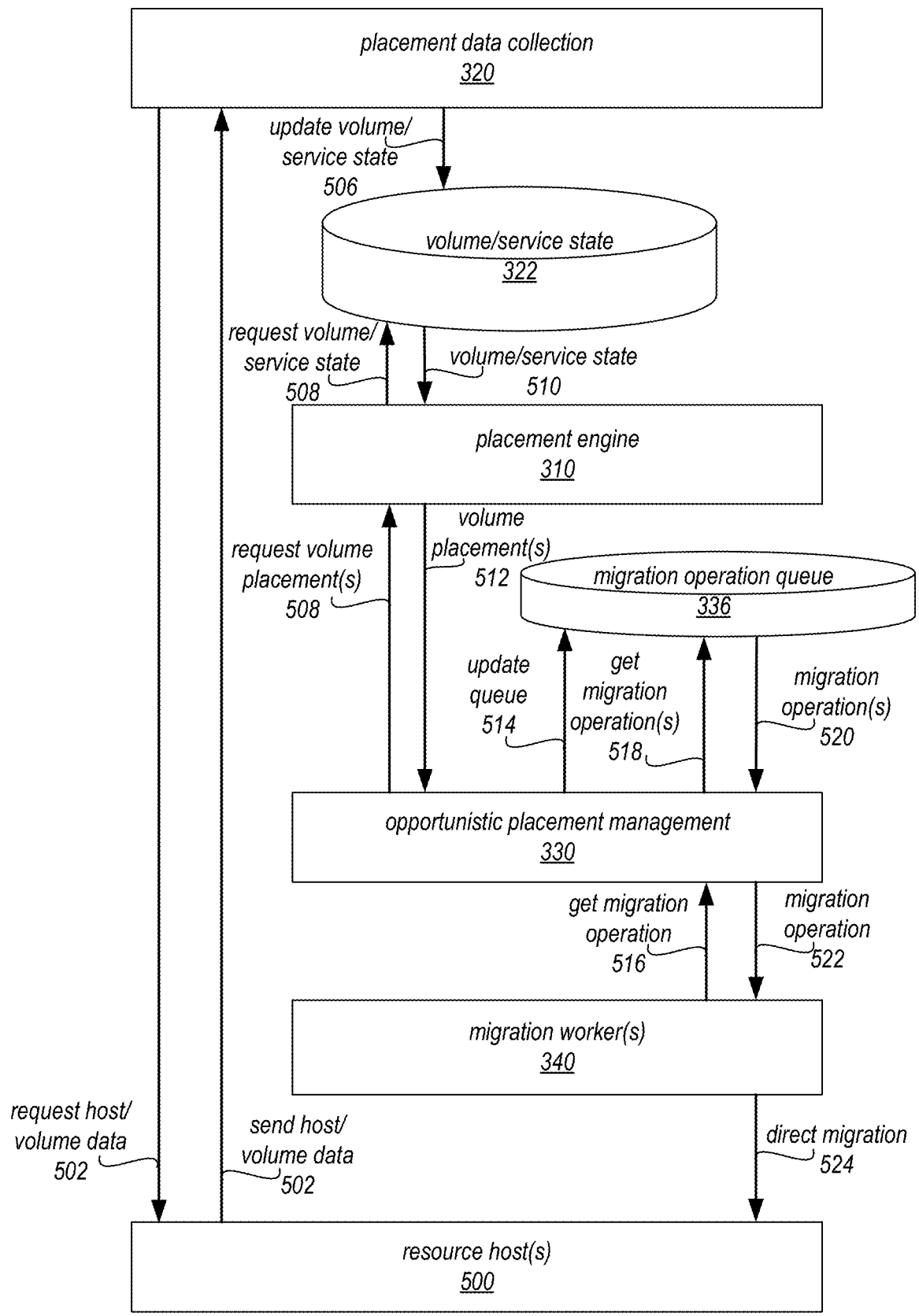
FIG. 5 is a logical block diagram illustrating interactions for opportunistically migrating data volumes in a block-based storage service, according to some embodiments.

FIG. 5 is a logical block diagram illustrating interactions for migrating resources (e.g. replicas of data volumes), according to some embodiments. As discussed above, placement data collection 320 may sweep or request host/volume data 502 from resource host(s) 500 in order to update volume service state 322. Resource host(s) 502 may send host/volume data to placement data collection 320, which may aggregate and/or update volume/service state 506. Opportunistic placement management 330 may request volume placement(s) 508 from placement engine 310. Placement engine 310 may determine placement locations, such as according to the techniques described above with regard to FIG. 3. Volume placement(s) 512 may be provided to opportunistic placement management 330. For those volumes (or resources) that exceed the migration optimization threshold, migration operation queue 514 may be updated to add new migration operations. Stale or completed migration operations may be removed from the migration queue 336.

Migration worker(s) 340 may get migration operations 516 from opportunistic placement manager 330. Opportunistic placement manager 330 may evaluate migration operation queue 336 to get candidate migration operation(s) 518. The migration operation(s) 520 from the migration operation queue 336 may be returned 522 to migration worker(s) 340. Migration worker(s) 340 may then direct the migration operation 524 to affected resource host(s) 500. In some embodiments, migration worker(s) 340 may act as intermediaries, and may obtain the resource from an originating resource host before sending the resource to the destination resource host. The various interactions and illustrations provided in FIG. 5 may be communicated using various standard or customized communication techniques. For example, various internal APIs for placement engine 310, opportunistic placement management 330, migration operation queue 336, volume service state 322, resource host(s) 500, etc., may each have respective interfaces (e.g., programmatic interfaces such as an API), and the respective communications in FIG. 5 may be formatted accordingly.

Figure 6:
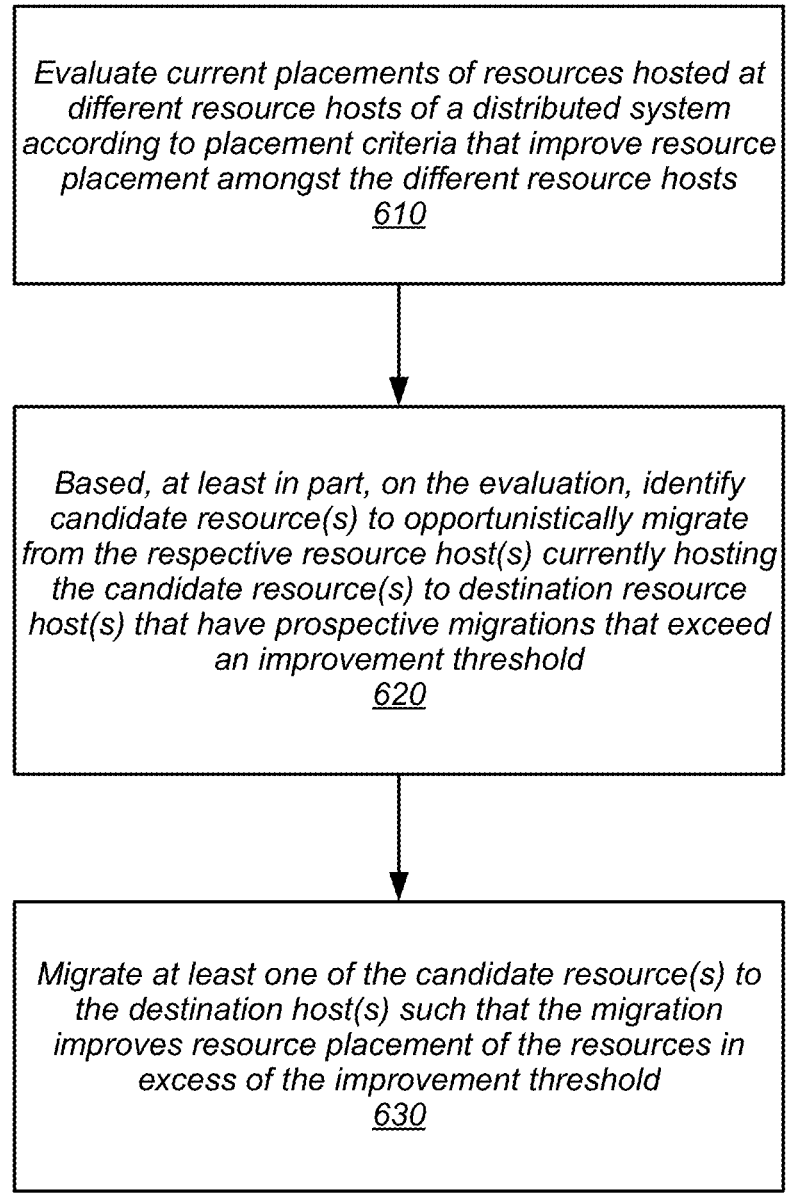
FIG. 6 is a high-level flowchart illustrating various methods and techniques for opportunistic resource migration to optimize resource placement, according to some embodiments.

The examples of opportunistic resource migration for resource placement discussed above with regard to FIGS. 2-5 have been given in regard to a block-based storage service and/or other network-based services. Various other types or configurations of distributed systems placing resources of distributed resources at resource hosts may implement these techniques. For example, a backup or archive distributed storage system may determine more optimal placements for currently placed data. Different configurations of the various modules, components, systems, and or services described above that may implement opportunistic resource migration for resource placement may be configured to evaluate current placement of resources, identify candidate resources, and migrate candidate resources. FIG. 6 is a high-level flowchart illustrating various methods and techniques for opportunistic resource migration to optimize resource placement, according to some embodiments. These techniques may be implemented using a control plane, opportunistic placement manager or other component for placing resources at currently placed at other resource hosts in a distributed system, as described above with regard to FIGS. 2-5.

Resources may be one of many different types of resources, such as one of various types of physical or virtualized computing resources, storage resources, or networking resources. Some resources may be part of a group of resources that make up a distributed resource. For example, a data volume of the block-based storage service described above with regard to FIGS. 2-5 may be a distributed resource that is implemented as a master replica and one or more replica slaves. Initial placement of resources at resource hosts may be performed when optimal placement locations are not available. Opportunistically migrating volumes to better locations may improve individual resource performance and/or distributed system performance according to various design goals, guarantees, or other desirable attributes for resources in the distributed system.

As indicated at 610, current placements of resources hosted at different resource hosts of a distributed system may be evaluated according to placement criteria that improve or optimize resource placement amongst the different resource hosts. Placement criteria may be various analyses, examinations, calculations, to determine the desirability or optimality of placement of a resource at a resource host and/or placement of resources amongst resource hosts as a whole (even if an individual placement may be less than optimal). For instance, placement criteria may evaluate resource utilization (e.g., storage resources, processing resources, networking resources, etc.) at a resource host to determine if the current placement of the resource is optimal with respect to the utilization of resources at the current resource host (e.g., the IOPs requirements of the resource strain the ability of the resource host to meet IOPs requirements for performing other tasks or hosting other resources).

In some embodiments, the configuration of the current placement of the resource may be determined with respect to other resources that make up a distributed resource. Consider the scenario where the resource acts as a secondary or backup replica of data to service access requests to the data in the event one or more primary replicas fail. In such a scenario it may be desirable to place the resource in a location that is not subject to common failure with the primary replicas. If, for instance, the resource was currently placed at a resource host connected to the same power source as another resource host hosting a replica resource, then an evaluation of the configuration of the distributed resource as a whole may indicate that a migration for the resource would optimize placement of that resource for the distributed resource, so that one of the resources (master or replica) was no longer placed at the resource host connected to the same power source as the other resource host. As placement criteria may be tailored to support, prevent, or otherwise account for various performance, failure and other scenarios, the number and type of placement criteria may vary including, but not limited to, configuration of the resource along with other resources if part of a distributed resource, available bytes, IOPs, or slots, a resource utilization balance, such as bytes to IOPs balance, impact on capacity fragmentation, hardware/software characteristics, and/or various desired location-based configurations. As discussed below with regard to FIG. 7, in some embodiments scores or other indicators of current placement suitability may be determined along with scores of potential destination resource hosts.

As indicated at 620, based at least in part, on the evaluation, identify candidate resource(s) to opportunistically migrate from the respective resource host(s) currently hosting the candidate resource(s) to destination resource host(s). The identified candidate resource(s) may have prospective migrations that exceed an improvement threshold, in various embodiments. For example, candidate resources may be identified as sub-optimal with respect to the placement criteria (e.g., failing a test, analysis, or threshold for optimal placement at one or more of the different placement criteria). Resource hosts available to receive the resource may be identified which are optimal with respect to the placement criteria (e.g., provide a location that can cure the failing test, analysis, or threshold). The pairing may exceed an improvement threshold by being identified. In some embodiments, the improvement threshold may act as an initial cost-benefit analysis decision, only identifying those resources as candidate resources that would experience great placement improvement if selected and the migration performed. The improvement threshold may also be implemented to determine whether or not a candidate migration would improve optimization of resources of the distributed system as a whole. For example, a candidate resource may be identified for performing a migration operation that would result in the improvement in placement of other resources without migrating the other resources. Identified candidate resource(s) may have a corresponding migration operation entry entered into a migration queue or other data structure for scheduling migration operations, such as discussed below. In this way, migration operations may happen opportunistically, to migrate the resource when a better location is available.

As indicated at 630, at least one of the candidate resource(s) may be migrated to the destination resource host(s) such that the migration improves resource placement of the resources in the distributed system in excess of the migration operation threshold. Improvement may be for placement of the migrated resource and/or placements of resources in the distributed system overall (e.g., resources less concentrated at certain locations). Performing migration operations opportunistically may allow for some migration operations to be performed for candidate resources which may have been identified after other resources are identified for migration. For example, in some embodiments, priorities or an ordering schema may be applied to select the performance of migration operations for those candidate resources that are identified. The priorities may allow those migration operations that make a greater difference to a resource, distributed resource of which the resource is a part, or the distributed system overall to be performed sooner than migrations which make smaller improvements to placement.

Migration of the resource may be performed by directing a current resource host to transfer the resource to the destination resource host. In some embodiments, an intermediary, such as worker(s) 340 in FIG. 3 may direct and/or receive the resource before sending the resource to the destination resource host. In at least some embodiments, the resource may not be physically migrated, but logically migrated (e.g., disabling or removing the resource from a current host and instantiating or creating the resource at the destination host). In some scenarios, destination resource hosts identified at the time a candidate resource host was identified may no longer be optimal (or even available as other resources may have been added in the interim). A new destination resource host may thus be identified, in some embodiments. For resources that are part of a distributed resource, the resource may not be selected if another resource in the distributed resource is currently being migrated, in some embodiments. Throttling techniques to limit migration operations may also be implemented, as discussed above with regard to FIG. 3.

Figure 7:
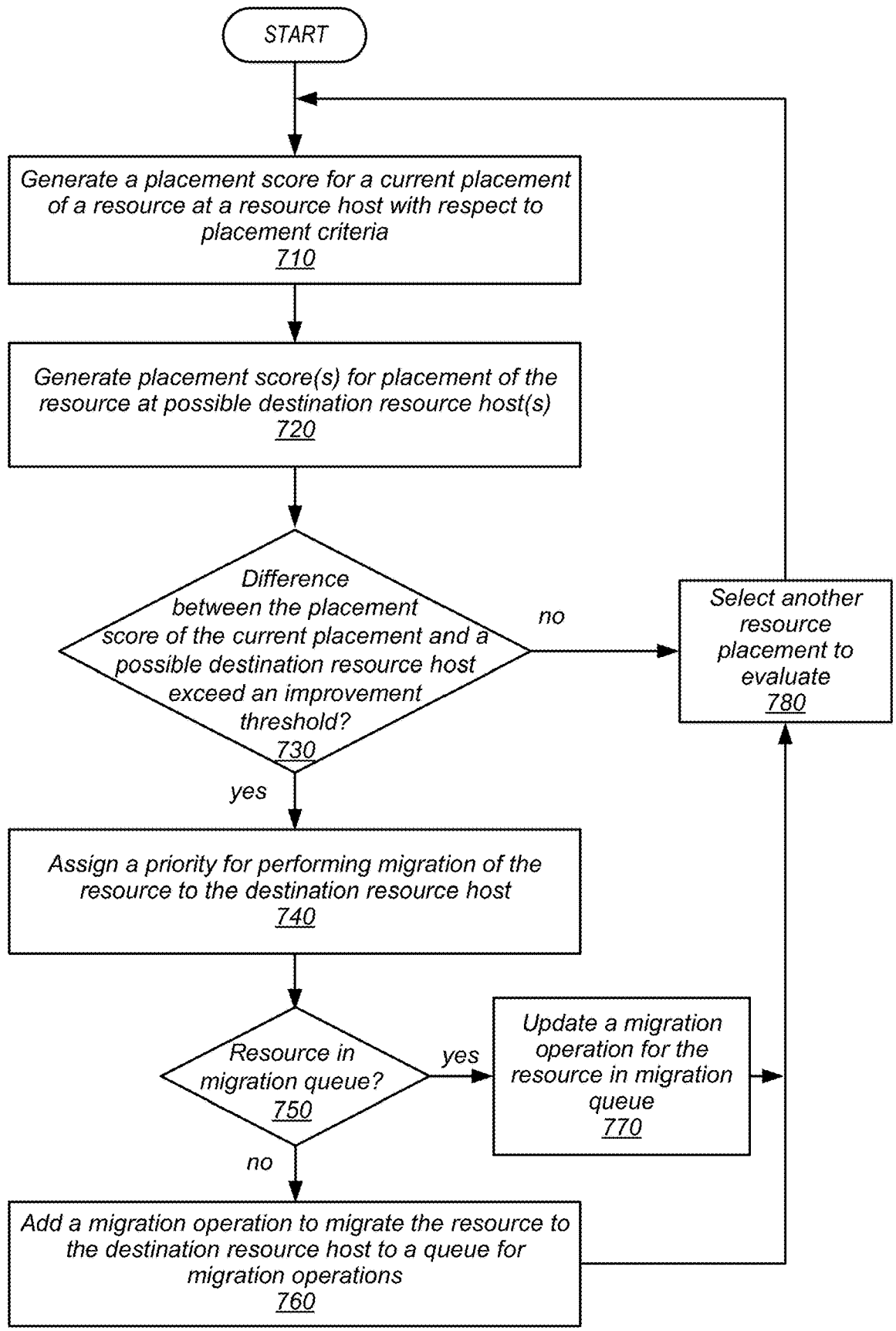
FIG. 7 is a high-level flowchart illustrating various methods and techniques for identifying resources as candidates for opportunistic resource migration, according to some embodiments.

FIG. 7 is a high-level flowchart illustrating various methods and techniques for identifying resources as candidates for opportunistic resource migration, according to some embodiments. As indicated at 710, a placement score for a current placement of a resource at a resource host may be generated with respect to one or more placement criteria. The placement criteria, as discussed above, may be used to optimize placement of the resource at the distributed system. For example, placement criteria may include configuration of the resource along with other resources if part of a distributed resource, available bytes, IOPs, or slots, a resource utilization balance, such as bytes to IOPs balance, impact on capacity fragmentation, hardware/software characteristics, and/or various desired location-based configurations. Consider the scenario where the resource is one of multiple resources that make up a distributed resource (e.g., a master or slave replica of a data volume as discussed above). It may be optimal to place the resource in a same infrastructure zone (e.g., connected to the same network router) as other resources of the distributed resource. The placement score may reflect a score on how close the current placement is with respect to the more optimal scenario (e.g., same network router). The score may be a composite of multiple different placement criteria, considering the impact on the resource, resource host, and/or distributed system as a whole.

Resource hosts may be initially evaluated to determine those resource hosts that can host the resource. For instance, hosts that do not satisfy certain conditions may be filtered out of consideration. Such conditions may include, but are not limited logical groups (e.g., identifying a particular server pool in which the resource is to be placed), capability or capacity to host the resource (e.g., sufficient bytes to store data, sufficient IOP bandwidth, appropriate hardware and/or software installed, etc.), location or diversity constraints (e.g., a resource that is part of a distributed resource cannot be placed on a resource host at the same server rack as another resource host hosting another resource of the distributed resource), and/or explicitly excluded resource hosts (e.g., a black list). The remaining available resource hosts that can host the resource may then be evaluated as potential destination hosts. For example, as indicated at 720, placement score(s) may be generated for the placement of the resource at possible destination resource host(s). In at least some embodiments, a subset of available resource hosts may have scores generated as a possible placement, while in other embodiments all available resource hosts may be considered by generating a placement scores. The same placement criteria used to generate the score at 710 may be used to generate the score at 720 (e.g., configuration of the resource along with other resources if part of a distributed resource, available bytes, IOPs, or slots, a resource utilization balance, such as bytes to IOPs balance, impact on capacity fragmentation, hardware/software characteristics, and/or various desired location-based configurations).

As indicated at 730, a difference between the placement score of the current placement of the resource and the scores of the possible placements may be determined and compared to an optimization threshold. For example, the difference may be a value which is compared to a threshold value (is difference >0.3). If the difference of any of the possible placements does not exceed the optimization threshold, as indicated by the negative exit from 730 then another resource may be selected to evaluate, as indicated at 780. However, if the difference of any placement exceeds the resource, then the resource may be identified as a candidate resource for migration. The possible destination that created the largest difference may be identified as the destination host (if more than one destination host was evaluated).

In at least some embodiments, a priority for performing the migration of the resource to the destination resource host may be assigned, as indicated at 740. Priority factors may be used to score, weight, generate or otherwise indicate the assigned priority. For example, priority factors may include the difference value between current and possible destination (e.g., to favor performing those migrations that make larger improvements), resource age or history (e.g., newer resources are less likely to exist as long and therefore migrations may not be as important), size or cost to perform the migration (e.g., delay migration if resource is a large data volume, complicated component or service, or other resource intensive migration), and/or local network state (e.g., to delay migration operations from being performed in locations within a distributed system that might be under network or other resource constraints because of foreground processing, such as serving client requests). These factors, along with others, may be weighted, combined, ordered, or selectively applied to determine a priority for the migration operation.

A migration queue or other data structure, resource, or schedule may be maintained to indicate the migration operations to be performed, along with priority of performing migration operations. The techniques described with regard to FIG. 7 may be used to periodically or aperiodically update the migration queue. For instance, the utilization of resource hosts in the distributed system may change due to resources being added, removed, or changed in some fashion. The migration decisions may change as a result. Periodically performing the techniques in FIG. 7 may be used to update or reprioritize migration operations in the migration queue according to changes that occur in the resource hosts of the distributed system. As indicated at 750, a determination may be made as to whether a migration operation for the resource is located in the migration queue. If so, as indicated by the positive exit from 750, then a migration operation for the resource in the migration queue may be updated. For instance, the priority assignment may be changed according to the new analysis at 740, migration operation metadata may change, such as the state of the migration operation (e.g., waiting, in-progress, complete), timestamps, a new destination host, or other information. In some embodiments, migration operations in progress may not be updated (e.g., in order to preserve metadata for subsequent analysis that is in the migration queue). If the resource is not in the migration queue, then as indicated by the negative exit from element 750, a migration operation may be added to migrate the resource to the destination resource host. Then as indicated at 780, another resource placement may be selected to evaluate.

Figure 8:
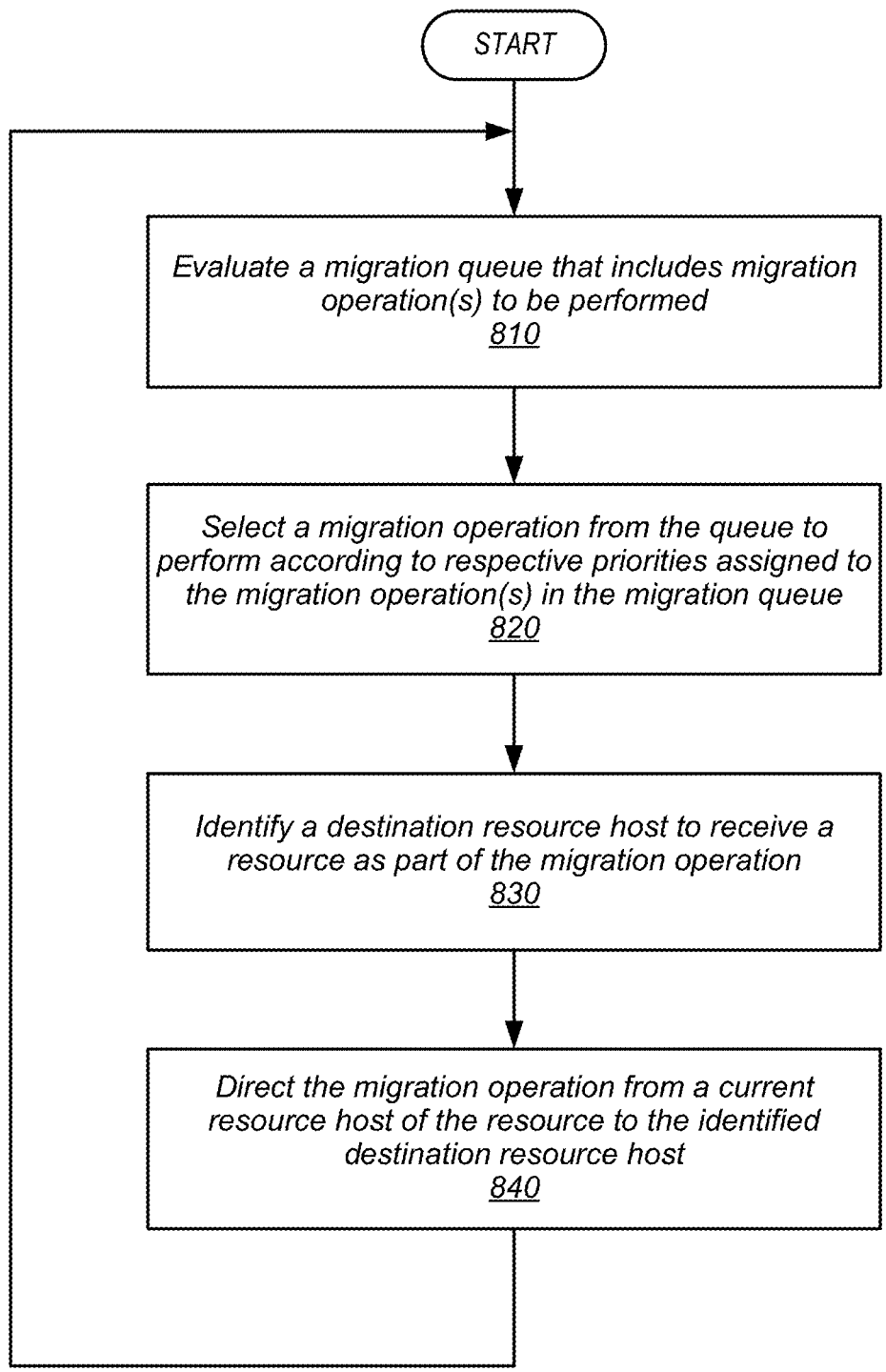
FIG. 8 is a high-level flowchart illustrating various methods and techniques for selecting and migrating candidate resources, according to some embodiments.

A migration queue or other structure indicating candidate resources for migration may be utilized to schedule and perform migration operations. For example, the performance of some migration operations may provide a greater benefit (either to the operation of the resource or to the distributed system) than other migration operations. FIG. 8 is a high-level flowchart illustrating various methods and techniques for selecting and migrating candidate resources, according to some embodiments.

As indicated at 810, a migration queue may be evaluated that includes migration operations to be performed, in some embodiments. Various information maintained for the migrations may be used to filter out those operations that do not need to be currently performed (e.g., migration operations already underway, failed, or otherwise not ready to be performed). In some embodiments, some migration operations may be performed in locations of the distributed system where migration operations are being throttled or limited to a particular number. Based, at least in part, on the evaluation, a migration operation may be selected from the queue to perform according to respective priorities assigned to the migration operations in the migration queue, as indicated at 820, in some embodiments. For example, the migration queue may be a priority queue and thus the highest priority migration operation may be selected from the migration queue. Various other priority or ordering schemas to schedule the performance of the migration operations may be implemented (e.g., First In First Out).

As indicated at 830, in some embodiments a destination resource host may be identified to receive a candidate resource of the migration operation, in some embodiments. For example, a request may be made to a placement engine or other system, service or device which may provide a new or different destination resource host based on current data instead of using a destination resource host selected at the time the migration operation was added to the migration queue. Alternatively, the destination resource host indicated in the migration operation entry in the migration queue may be identified as the destination resource host.

The migration operation from a current resource host to the identified destination resource host may be direct, as indicated at 840. For example, a command or instruction may be sent to the resource host of the current location send, copy, communicate, or otherwise transfer the candidate resource to the destination resource host. In some embodiments, the current resource host may be configured to perform this transfer without further direction. In at least some embodiments, the resource may first be obtained from the current resource host and then transferred by way of an intermediary, such as migration worker(s) 340. Migrating the resource host may include performing or directing various configuration operations at the destination resource host. For instance, as discussed above with regard to FIGS. 2-5 a migration of a replica of a data volume that involves a slave replica and a master replica may involve configuring the destination resource host to act as a slave or master for the replica of the data volume depending on the type of replica migrated.

The techniques illustrated in FIG. 8 may be performed by one or many different systems or devices. For instance, an opportunistic migration manager, such as 330 in FIG. 3, may perform the evaluation of a migration queue and select the migration operation to perform, while migration worker(s), such as 340 in FIG. 3, may perform the identification of the destination resource host to receive a resource as part of the migration operation and direct the migration operation. As migration may be performed asynchronously a migration worker may direct the migration operation of a resource and then obtain and direct another migration operation. In some embodiments, a single migration manager may perform all of the various techniques discussed above. Alternatively, a migration worker may perform the techniques above. Thus, the previous examples are not intended to be limiting.

Figure 9:
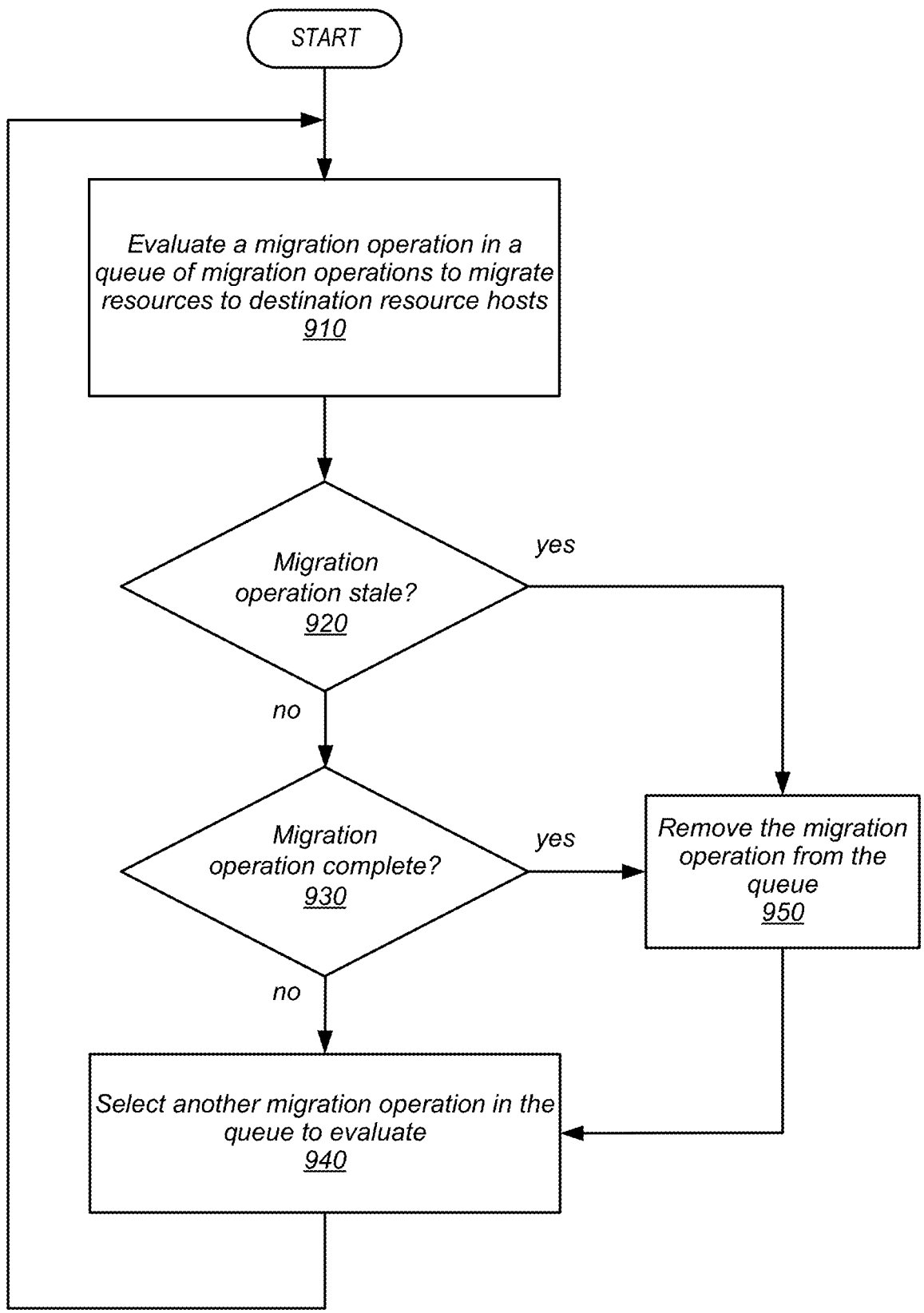
FIG. 9 is a high-level flowchart illustrating various methods and techniques for removing candidate resources from a migration queue, according to some embodiments.

As noted above with regard to FIG. 4, a migration queue or other structure indicating candidate resources for migration may maintain state information for the candidate resources. Changes to the state information in the migration queue may render some migration operations in the migration queue obsolete. FIG. 9 is a high-level flowchart illustrating various methods and techniques for removing candidate resources from a migration queue, according to some embodiments. As indicated at 910, a migration operation in a queue of migration operations to migrate resources to destination resource hosts (e.g., migration queue 400 in FIG. 4) may be evaluated. For instance, each entry in the migration queue may be evaluated to identify those migration operations which should be removed from the migration queue. Elements 920 and 930 provide examples of conditions that may trigger removal of a migration operation.

The state of resource hosts in a distributed system may change frequently. Resources may be created, removed, or change in operation or utilization of a resource host. This dynamic landscape may alter earlier decisions to migrate resources. For instance, as discussed in FIG. 7 above, if the priority of migration changes for a candidate resource, then the priority included in the migration queue may be updated to reflect a current priority for the migration. In some embodiments, some migration operations may no longer be optimal. As indicated at 920, if the migration operation becomes stale, then as indicated by the positive exit from 920 the migration operation may be removed from the queue, as indicated at 950.

Stale migration operations may be operations which may no longer be optimal to perform (e.g., according to the placement criteria discussed above), in various embodiments. For example, stale migration operations may have not been updated with a new priority or state information. If the priority and/or other state information of the migration operation was not updated the last time a prioritization sweep of the migration queue was performed, then it may indicate that the migration operation may no longer be optimal to perform. A timestamp or other indication may be maintained for the migration operation which would indicate the time of last update. Exceptions may be made, in some embodiments, for migration operations in the "in-progress" state, which may not have an updated timestamp. In some embodiments, a comparison may be between the timestamp and a time to live threshold, which if exceed would indicate that the migration operation is stale. In some embodiments, a marker or other indication (e.g., a tombstone) may be placed in the entry for the migration operation in the migration queue indicating that the migration operation is stale and should be removed. In some scenarios, a migration operation which indicates that the migration operation was begun but failed or otherwise did not complete (e.g., by comparing a time in a "migrating" state to a migration time threshold).

As indicated at 930, if the migration operation is complete, then as indicated by the positive exit from 930, the migration operation may be removed from the migration queue, as indicated at 950. For example, migration operation state may be changed during a priority sweep of the migration queue to update the state of a migration operation to complete.

As some migration operations may take longer than others (e.g., some resources may be larger than other resources), a migration operation may remain in the migration queue until a removal condition, such as illustrated by elements 920 and 930, is satisfied. Thus, if no removal condition is satisfied, another migration operation in the queue may be selected to evaluate, as indicated at 940. The technique illustrated in FIG. 9 may be performed until all of the migration operations in the migration queue have been evaluated. A period of time may lapse before the migration queue is evaluated again to remove migration operations.

The methods described herein may in various embodiments be implemented by any combination of hardware and software. For example, in one embodiment, the methods may be implemented by a computer system (e.g., a computer system as in FIG. 10) that includes one or more processors executing program instructions stored on a computer-readable storage medium coupled to the processors. The program instructions may be configured to implement the functionality described herein (e.g., the functionality of various servers, resource hosts, control planes, managers and/or other components, such as those that implement the block-based storage service described herein). The various methods as illustrated in the figures and described herein represent example embodiments of methods. The order of any method may be changed, and various elements may be added, reordered, combined, omitted, modified, etc.

Figure 10:
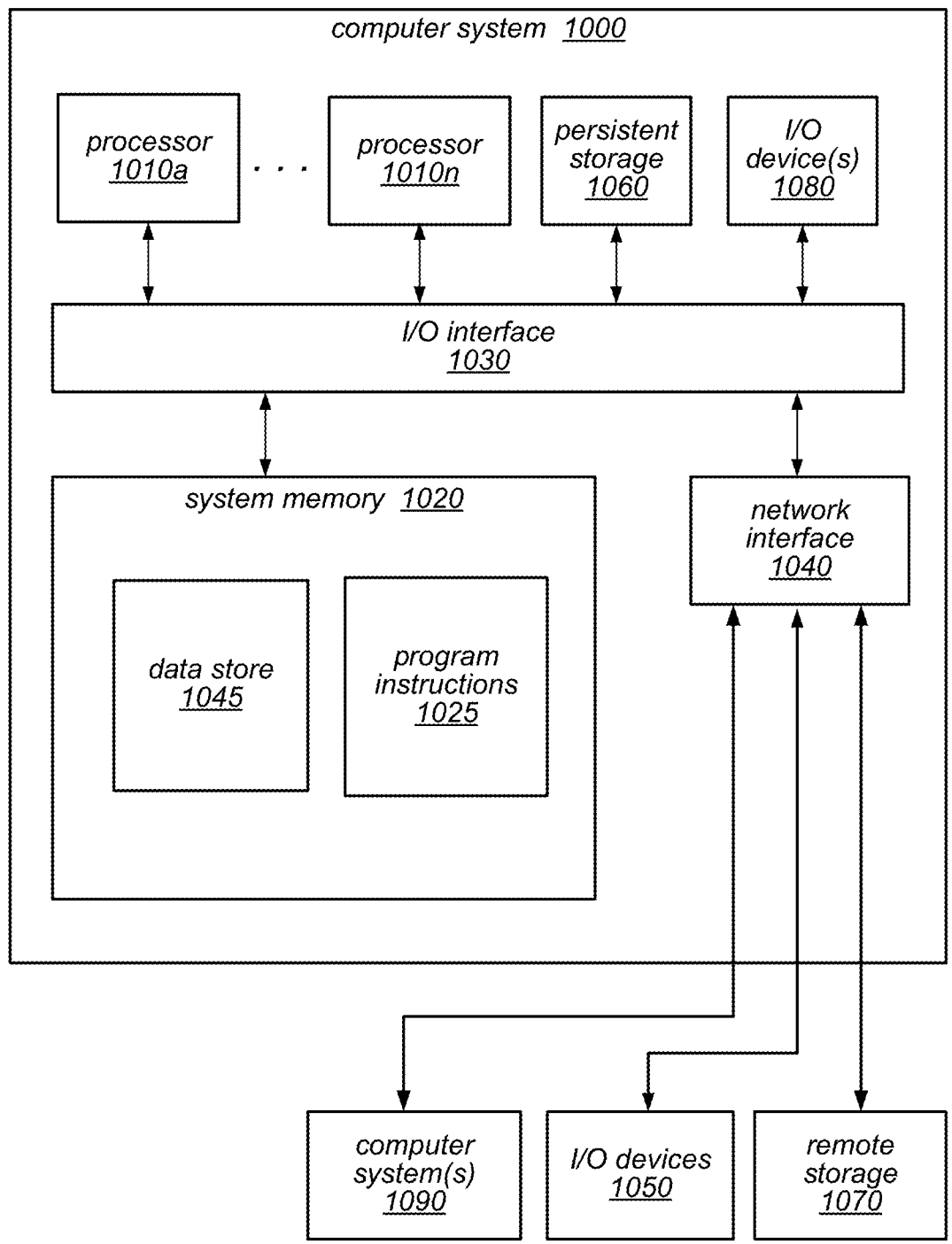
FIG. 10 is a block diagram illustrating an example computing system, according to some embodiments.

Embodiments of opportunistic resource migration for optimizing resource placement as described herein may be executed on one or more computer systems, which may interact with various other devices. FIG. 10 is a block diagram illustrating an example computer system, according to various embodiments. For example, computer system 1000 may be configured to implement storage and/or compute nodes of a compute cluster, a data stores, and/or a client, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, block-based storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a resource host, in different embodiments. In some embodiments, program instructions 1025 may implement multiple separate clients, nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. In general, system memory 1020 (e.g., data store 1045 within system memory 1020), persistent storage 1060, and/or remote storage 1070 may store data blocks, replicas of data blocks, metadata associated with data blocks and/or their state, configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090, for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 10 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing and/or storage services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations. though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A distributed system, comprising:
a plurality of resource hosts respectively hosting one or more of a plurality of resources, wherein the plurality of resources comprise respective computing resources, storage resources or networking resources, and wherein the plurality of resource hosts make the respective resources accessible over a network;
one or more computing devices comprising one or more hardware processors and memory to implement an opportunistic placement manager, configured to:
evaluate current placements of the plurality of resources according to one or more placement criteria, wherein the one or more placement criteria comprise an evaluation of a current placement configuration for the plurality of resources to at least improve resource placement of the plurality of resources as a whole amongst the plurality of resource hosts for the distributed system;
based, at least in part, on the evaluation, identify one or more candidate resources of the plurality of resources to migrate from the respective resource hosts currently hosting the one or more candidate resources to respective destination resource hosts of the plurality of resource hosts, wherein the respective destination resource hosts currently make one or more other resources of the plurality of resources accessible over the network, wherein the prospective migrations of the one or more candidate resources of the plurality of resources exceed an improvement threshold with respect to the one or more placement criteria; and
direct a migration operation to migrate at least one of the one or more candidate resources to the respective destination resource host, wherein the migration of the at least one candidate resource to the respective destination resource host improves resource placement of the plurality of resources in excess of the improvement threshold.

2. The system of claim 1,
wherein to identify the one or more candidate resources of the plurality of resources, the opportunistic placement manager is configured to:
determine respective priorities for migration of the one or more candidate resources;
place respective migration operations for the one or more candidate resources into a queue;
wherein the opportunistic placement manager is further configured to:
based, at least in part, on an evaluation of the queue, select the at least one candidate resource to migrate according to the respective priorities assigned to the one or more candidate resources.

3. The system of claim 2, further comprising:
a plurality of migration workers;
wherein, to direct the migration operation to migrate the at least one candidate resource, the opportunistic placement manager is configured to send the migration operation to one of the plurality of migration workers to perform.

4. The system of claim 1, wherein the distributed system is a virtual block-based storage service, wherein the plurality of resources are a plurality of storage services comprising data volumes maintained for a plurality of clients of the virtual block-based storage service.

5. A method, comprising:
performing, by one or more computing devices comprising one or more hardware processors and memory:
evaluating current placements of a plurality of resources hosted at respective ones of a plurality of resource hosts of a distributed system according to one or more placement criteria, wherein the plurality of resources comprise respective computing resources, storage resources or networking resources, wherein the plurality of resource hosts make respective resources of the plurality of resources accessible over a network, wherein the one or more placement criteria comprise an evaluation of a current placement configuration for the plurality of resources to at least improve resource placement of the plurality of resources as a whole amongst the plurality of resource hosts for the distributed system;
based, at least in part, on the evaluation, identifying one or more candidate resources of the plurality of resources to migrate from the respective resource hosts currently hosting the one or more candidate resources to respective destination resource hosts of the plurality of resource hosts, wherein the respective destination resource hosts currently make one or more other resources of the plurality of resources accessible over the network, wherein the prospective migrations of the one or more candidate resources of the plurality of resources exceed an improvement threshold; and migrating at least one of the one or more candidate resources to the respective destination resource host, wherein the migration of the at least one candidate resource to the respective destination resource host improves resource placement of the plurality of resources in excess of the improvement threshold.

6. The method of claim 5,
wherein identifying one or more candidate resources of the plurality of resources comprises assigning respective priorities for performing migration of the one or more candidate resources; and
wherein the method further comprises selecting the at least one candidate resource to migrate according to the respective priorities assigned to the one or more candidate resources.

7. The method of claim 6, further comprising:
updating the respective priorities of the one or more candidate resources according to another evaluation of the current placements of the plurality of resources; and
selecting another one of the one or more candidate resources to migrate according to the updated respective priorities of the one or more candidate resources.

8. The method of claim 6,
wherein identifying the one or more candidate resources of the plurality of resources further comprises placing respective migration operations for the one or more candidate resources into a queue; and
wherein selecting the at least one candidate resource to migrate according to the respective priorities assigned to the one or more candidate resources is performed based on an evaluation of the queue.

9. The method of claim 8, further comprising removing at least one of the one or more candidate resources from the queue according to another evaluation of the current placements of the plurality of resources.

10. The method of claim 5, wherein evaluating current placements of the plurality of resources hosted at the respective ones of the plurality of resource hosts of the distributed system according to the one or more placement criteria comprises:
generating respective placement scores for the current placements of the plurality of resources according to the one or more placement criteria;
wherein identifying the one or more candidate resources of the plurality of resources comprises:
generating respective placement scores for one or more possible placements of the plurality of resources according to the one or more placement criteria;
calculating respective score differences between the respective placement scores for the current placements and the respective placement scores for one or more possible placements; and
determining as the one or more candidate resources those resources with respective score differences that exceed the improvement threshold.

11. The method of claim 5, wherein the at least one candidate resource is one of a plurality of resources that implement a distributed resource.

12. The method of claim 5, wherein migrating the at least one of the one or more candidate resources to the respective destination resource host comprises identifying the destination resource host.

13. The method of claim 5, wherein migrating the at least one candidate resource to the respective destination resource host improves placement for another resource of the plurality of resources.

14. The method of claim 5, wherein the distributed system is a network-based service, wherein the plurality of resources are maintained at the network-based service for a plurality of clients of the network-based service, and wherein the evaluating, the identifying, the migrating are performed as part of a background service for the network-based service.

15. A non-transitory, computer-readable storage medium, storing program instructions that when executed by one or more computing devices comprising one or more hardware processors and memory cause the one or more computing devices to implement:
evaluating current placements of a plurality of resources hosted at respective ones of a plurality of resource hosts of a distributed system according to one or more placement criteria, wherein the plurality of resources comprise respective computing resources, storage resources or networking resources, wherein the plurality of resource hosts make respective resources of the plurality of resources accessible over a network, wherein the one or more placement criteria comprise an evaluation of a current placement configuration for the plurality of resources to at least improve resource placement of the plurality of resources as a whole amongst the plurality of resource hosts for the distributed system;
based, at least in part, on the evaluation, identifying one or more candidate resources of the plurality of resources to migrate from the respective resource hosts currently hosting the one or more candidate resources to respective destination resource hosts of the plurality of resource hosts, wherein the respective destination resource hosts currently make one or more other resources of the plurality of resources accessible over the network, wherein the prospective migrations of the one or more candidate resources of the plurality of resources exceed an improvement threshold; and
migrating at least one of the one or more candidate resources to the respective destination resource host, wherein the migration of the at least one candidate resource to the respective destination resource host improves resource placement of the plurality of resources in excess of the improvement threshold.

16. The non-transitory, computer-readable storage medium of claim 15,
wherein, in identifying one or more candidate resources of the plurality of resources, the program instructions cause the one or more computing devices to implement assigning respective priorities for performing migration of the one or more candidate resources; and
wherein the program instructions further cause the one or more computing devices to implement selecting the at least one candidate resource to migrate according to the respective priorities assigned to the one or more candidate resources.

17. The non-transitory, computer-readable storage medium of claim 16, wherein the program instructions cause the one or more computing devices to further implement:
updating the respective priorities of the one or more candidate resources according to another evaluation of the current placements of the plurality of resources; and
selecting another one of the one or more candidate resources to migrate according to the updated respective priorities of the one or more candidate resources.

18. The non-transitory, computer-readable storage medium of claim 16, wherein, in identifying the one or more candidate resources of the plurality of resources, the program instructions cause the one or more computing devices to further implement placing respective migration operations for the one or more candidate resources into a queue; and wherein selecting the at least one candidate resource to migrate according to the respective priorities assigned to the one or more candidate resources is performed based on an evaluation of the queue.

19. The non-transitory, computer-readable storage medium of claim 18, wherein the program instructions cause the one or more computing devices to implement:

determining that the respective migration operation for the at least one candidate resource is complete; and in response to determining that the respective migration operation is complete, removing the respective migration operation from the migration queue.

20. The non-transitory, computer-readable storage medium of claim 15, wherein, in evaluating current placements of the plurality of resources hosted at the respective ones of the plurality of resource hosts of the distributed system according to the one or more placement criteria, the program instructions cause the one or more computing devices to implement generating respective placement scores for the current placements of the plurality of resources according to the one or more placement criteria;

wherein, in identifying the one or more candidate resources of the plurality of resources, the program instructions cause the one or more computing devices to implement:

generating respective placement scores for one or more possible placements of the plurality of resources according to the one or more placement criteria;

calculating respective score differences between the respective placement scores for the current placements and the respective placement scores for one or more possible placements; and determining as the one or more candidate resources those resources with respective score differences that exceed the improvement threshold.

21. The non-transitory, computer-readable storage medium of claim 15, wherein the distributed system is a virtual block-based storage service, and wherein the plurality of resources are storage services comprising data volumes maintained for a plurality of clients of the virtual block-based storage service.

* * * * *